(12) United States Patent
Sandgren

(10) Patent No.: US 12,119,003 B2
(45) Date of Patent: Oct. 15, 2024

(54) METHODS AND SYSTEMS FOR COMBINED VOICE AND SIGNALING

(71) Applicant: LIVEPERSON, INC., New York, NY (US)

(72) Inventor: Thorsten Ohrstrom Sandgren, New York, NY (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 18/393,319

(22) Filed: Dec. 21, 2023

(65) Prior Publication Data

US 2024/0212679 A1 Jun. 27, 2024

Related U.S. Application Data

(60) Provisional application No. 63/434,221, filed on Dec. 21, 2022.

(51) Int. Cl.
*G10L 15/22* (2006.01)
*H04L 51/02* (2022.01)
*H04M 7/12* (2006.01)
*H04W 76/14* (2018.01)

(52) U.S. Cl.
CPC ............. *G10L 15/22* (2013.01); *H04L 51/02* (2013.01); *H04M 7/1295* (2013.01); *H04W 76/14* (2018.02); *G10L 2015/223* (2013.01)

(58) Field of Classification Search
CPC .. G10L 15/22; G10L 2015/223; H04W 76/14; H04L 51/02; H04M 7/1295
See application file for complete search history.

(56) References Cited

U.S. PATENT DOCUMENTS

2002/0196920 A1\* 12/2002 Golan ................. H04M 3/4228
379/201.01
2018/0307687 A1\* 10/2018 Natkin .................. G06F 16/248

FOREIGN PATENT DOCUMENTS

WO WO-2009048443 A1 \* 4/2009 ........ H04M 1/72513

\* cited by examiner

*Primary Examiner* — Fan S Tsang
*Assistant Examiner* — David Siegel
(74) *Attorney, Agent, or Firm* — POLSINELLI LLP

(57) ABSTRACT

A computing device of a communication network may generate a first connection context that can manage a first voice connection between a first device and a second device. A signal may be received over the first connection context indicative of a request by the first device. In response, the computing device may connect the first device to a second connection context that can manage a second voice connection between the first device and an automated service such as a communication bot. The first device can transmit natural language requests to the automated service. The automated service facilitates execution of the natural language requests by the computing device.

17 Claims, 8 Drawing Sheets

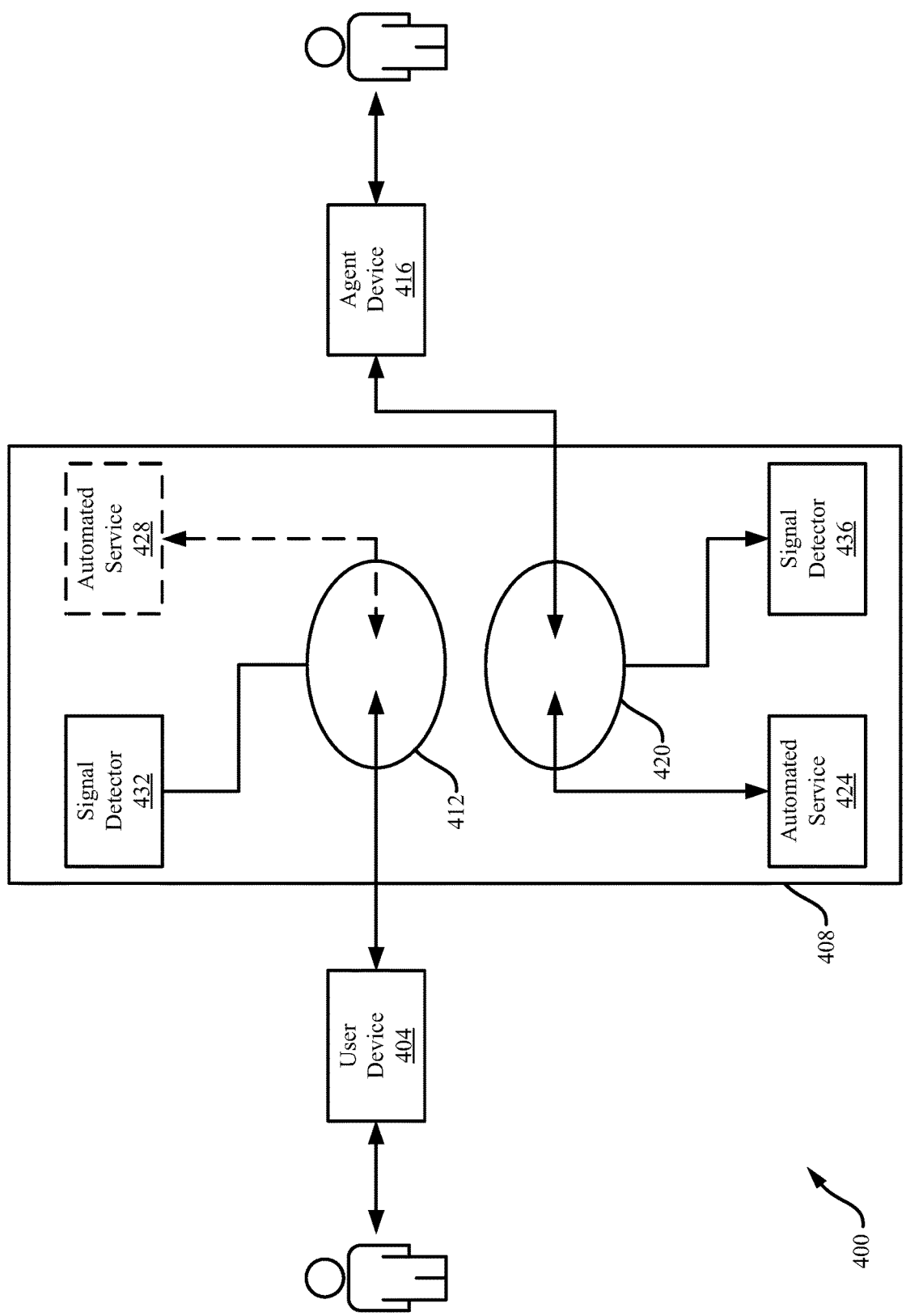

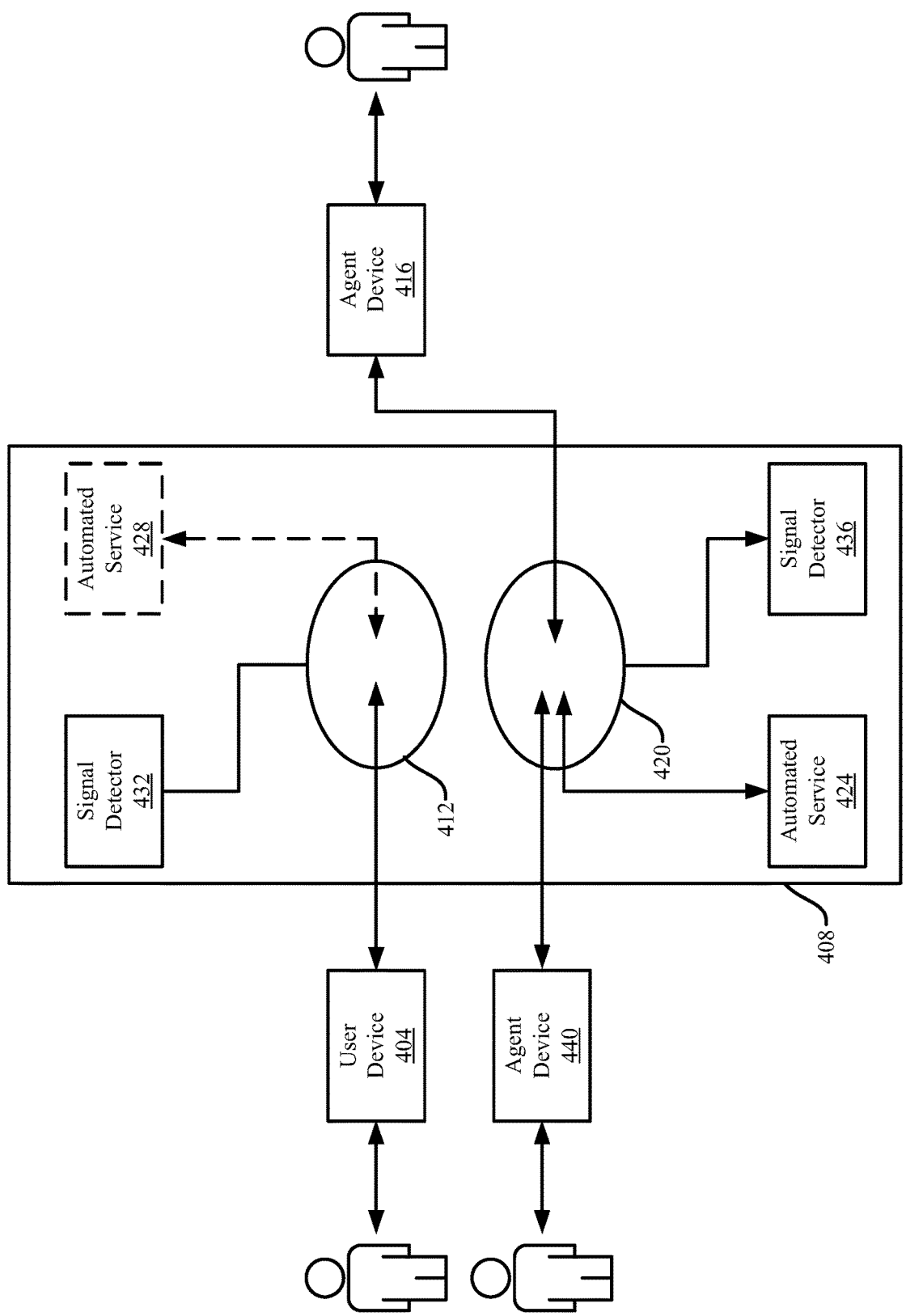

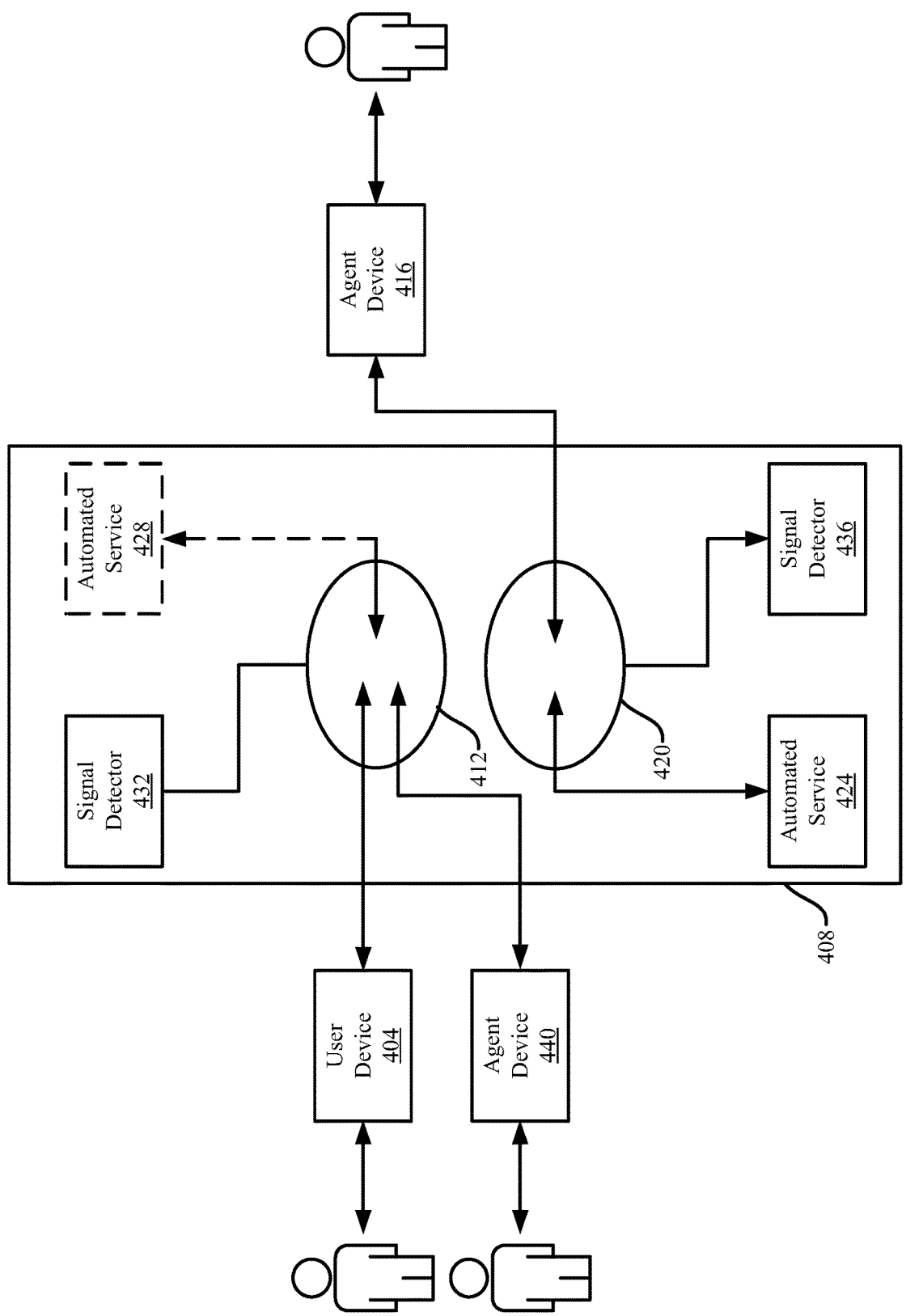

METHODS AND SYSTEMS FOR COMBINED VOICE AND SIGNALING

CROSS-REFERENCE TO RELATED APPLICATIONS

The present patent application claims the benefit of priority to U.S. Provisional Patent Application No. 63/434,221 filed Dec. 21, 2022, which is incorporated herein by reference in its entirety for all purposes.

TECHNICAL FIELD

This disclosure relates generally to combining voice and signal over single communication channel; and more specifically embedding executable instructions within a voice communication channel.

BACKGROUND

Knowledge systems operate to provide specific information in response to queries. Knowledge systems may operate with a combination of automated and manual processing. For some queries, such as those that are commonly requested or that may have simple responses, knowledge systems may define predetermined responses or use algorithms to dynamically define responses to queries. Other queries may be too complex or specialized for knowledge systems to generate automated responses. The knowledge system may connect to a terminal device of a communication network to allow an agent to manually provide responses to the query. The communication network may include a finite quantity of terminal devices, which may increase the time interval between the query and the response. In addition, the complexity of the query may cause multiple terminal devices to be involved further increasing that time interval.

SUMMARY

Methods are described herein for combined voice and signaling over a communication channel. The methods may include generating a first connection context configured to manage a first voice connection between a first device and a second device; receiving, by the connection context, a signal over the first voice connection, the signal indicative of a request by the first device; connecting, in response to receiving the signal, the first device to a second connection context, the second connection context being configured to manage a second voice connection between the first device and another device, and wherein connecting the first device to the second connection context causes the first device to be disconnected from the first connection context; receiving, by the second connection context, a command interpreted from a communication associated with the first device; and executing the command Systems are described herein for combined voice and signaling over a communication channel. The systems include one or more processors and a non-transitory computer-readable medium storing instructions that, when executed by the one or more processors, cause the one or more processors to perform any of the methods as previously described.

The non-transitory computer-readable media described herein may store instructions which, when executed by one or more processors, cause the one or more processors to perform any of the methods as previously described.

These illustrative examples are mentioned not to limit or define the disclosure, but to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 4A depicts a block diagram of combined voice and signaling of an example communication network that executes functions that manage multiple, concurrent communication channels in response to a received signal according to aspects of the present disclosure.

FIG. 4B depicts a block diagram of combined voice and signaling of an example communication network that executes functions managing concurrent communications between users, agents, and automated services in response to received signals according to aspects of the present disclosure.

FIG. 4C depicts a block diagram of combined voice and signaling of an example communication network configured to route communications and connections between various devices and services according to aspects of the present disclosure.

DETAILED DESCRIPTION

Figure 1:
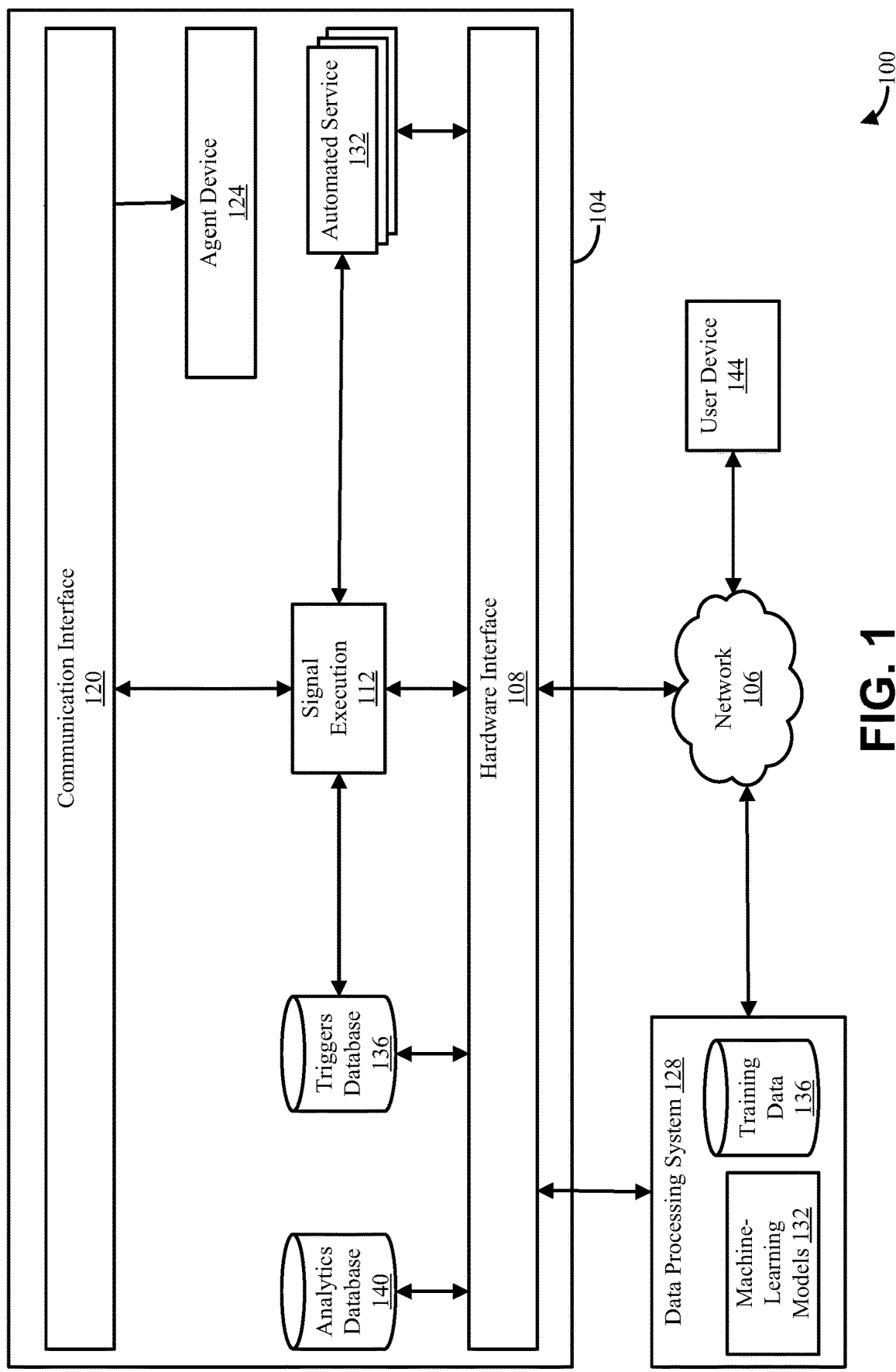
FIG. 1 depicts a block diagram of an example specific-purpose voice and signaling system according to aspects of the present disclosure.

The present disclosure includes systems and methods for a combined voice and signaling over a communication channel. A communication network may facilitate, route, and manage communications between user devices and agent devices. The communication network may include one or more terminal devices configured to communicate with user devices over one or more communication channels (e.g., such as, but not limited to, video conference, instant messaging, email, telephonic, direct messaging, text messaging, etc.). User devices may transmit a connection request to the communication network over a particular communication channel, which may route the communications to a particular terminal device configured to communicate over the particular communication channel. The terminal device, while operating within the communication network, may access application programming interfaces (API's) and other controls of the communication network to modify the communication channel, route communications, resolve queries, etc. The API and/or control calls may be received along data transmission path parallel to the communication channel. Upon being received by the communication network, the communication network may execute the API and/or control call to implement the requested function.

In some instances, the communication network may route communications to external devices (e.g., devices that may not be connected to the communication network, devices that may lack the capability to invoke functions and/or controls of the communication network, etc.). For example, the communication network may route a telephone communication to a telephone of an agent. If the external device lacks connectivity hardware and/or software configured to transmit data parallel to the communications, the external device may be unable to execute API calls or controls of the communication network. The limited capability of external device may prevent the agent from routing communications to other device or to automated services, retrieve information associated with user devices and/or the users thereof, etc. The communication network may extend the functionality of limited-functionality devices to the API and/or controls by combining voice and signaling over the communication channel.

The communication network may monitor the connection for signals being transmitted through the communication channel. The signals may use a same form or format as the communications being transmitted through the communication channel to enable the signals to be generated, transmitted, and interpreted, by devices that may lack the capability to transmit or receive signals transmitted over separate, parallel communication channels. In some instances, the signals may be transmitted over a particular frequency range to avoid interference with other communications transmitted over the communication channel and to improve detection of the signal. For example, voice communications may use a frequency of approximately 80-255 Hz (which may be transmitted at a high frequency of approximately 3.4 MHZ). To avoid interference, the external device may transmit the signal over a frequency range that is outside human hearing (e.g., approximately lower than 20 Hz or approximately higher than 20 kHz). Alternatively, or additionally, the signal may be transmitted over a particular frequency range for a predetermined time interval so as to appear distinct from other communications transmitted over the communication channel. Alternatively, or additionally, the signal may be transmitted at a particular time interval in which other communications may not being transmitted so as to further prevent interference with the other communications. Alternatively, or additionally, the communication network may implement bandpass filters that may prevent a signal transmitted from the user device from reaching the external device or may prevent a signal transmitted from the external device from reaching the user device.

The communication network may receive the signal and execute one or more functions based on the signal. The one or more functions include functions that can be executed by terminal devices operating within the communication network so as to extend the additional functionality of terminal devices to external device. In some instances, the signal may be a Boolean signal (e.g., present or not present), which causes the communication network to execute one or more functions (e.g., selected based on the frequency over which the signal is transmitted or detected). In other instances, the signal may be a digital signal include a series of peaks and valleys that correspond to a sequence of 1's and 0's of a binary instruction set. The communication network may execute the binary instruction set to implement the one or more functions. In still yet other instances, the signal may be an analog signal that may be interpreted by the communication network (e.g., using pattern matching though machine-learning models, etc.) as corresponding to one or more functions to be executed by the communication network.

Examples of functions that can be executed by the communication network based on received signals include, but are not limited to, generating a new connection context, connecting the user device to an automated service (e.g., an automated communication process such as a bot, etc.), connecting the user device to a contextual menu, connecting the user device to another terminal device or device operated by an agent, connecting the external device to a terminal device or device operated by an agent, connecting the external device to another user device, connecting the external device to an automated service configured to provide additional functionality to the external device, connect the external device to an execution environment (e.g., configured to execute queries, functions, remote procedure calls, API function calls, controls, etc. using a communication type that the external device is configured to transmit such as audio, video, text, data, gesture, etc.), modify the communication channel (e.g., from a first communication channel type to another communication channel type), combinations thereof, or the like.

Once the one or more functions are executed, the communication network may transmit a response signal to the device that transmitted the initial signal. The response signal may the same signal as the initial signal, the same signal type (e.g., Boolean, digital, analog, etc.) as the initial signal, or another signal. The response signal may indicate that the initial signal was received by the communication network and/or whether the one or more functions have been executed. The device that transmitted the initial signal may then determine whether any subsequent signals should be transmitted. For example, if the response signal indicated a different one or more functions were executed then were intended by the initial signal or if the response signal was received when no initial signal was transmitted, the device receiving the response signal may transmit a new signal to the communication network. The new signal may correct indicate to the communication network that the initial signal was executed in error. The communication network may revoke execution of the one or more functions (e.g., terminate execution of the one or more functions or execute one or more new functions that undo anything implemented by the initial one or more functions). The communication network may then wait until a new signal is received.

For example, the external device may transmit a signal within the communication channel that may be detected by the communication network. The communication network, based on detecting the signal, may pause the communication channel and connect the external device to an automated service configured to provide additional functionality to the external device (e.g., such as any functionality available to terminal devices operating within the communication network, etc.).

Automated services may be configured to communicate with user devices, terminal devices, external devices, or the like using communication protocol and/or communication conventions available to the user devices, terminal devices, external devices, or the like. For example, automated services may communicate using a synthetic voice, generated video (e.g., for sign language or other gesture-based communication, text, etc. over a communication channel or protocol usable by the other devices within the communication session. Automated services may be used to automatically to respond to queries, execute commands or functions, implement changes requested by authorized users, etc.

In some examples, automated services may include one or more machine-learning models configured to process input speech, gestures, and/or text; identify a response based on the input; and generate a corresponding speech, gesture, and/or text output. An artificial-intelligence data processing system may efficiently process data from disparate. For instance, audio segments including spoken words may be processed by a recurrent neural network configured to identify the semantic meaning of the spoken words in an audio segment. Other machine-learning models may be configured to process other data types such as formal orthographic alphanumeric strings, informal orthographic alphanumeric strings, raw data (e.g., tables, arrays, other data structures, etc.), video (e.g., image processing, image/object identification, semantic identification, etc.), and/or the like. Alternatively, a single machine-learning model (e.g., such an ensemble model, deep learning network, etc.) may be used to perform the aforementioned functionality of the one or more machine-learning models.

The one or more machine-learning models may include, but are not limited to neural networks, generative adversarial networks, deep learning networks, recurrent neural networks, convolutional neural networks, classifiers, support vector machines, Naïve Bayes, k-nearest neighbors, k-means, other clustering models, regression-based models, decision trees, and/or the like.

The communication network may receive communications associated with multiple communication sessions facilitated by the communication network (e.g., over one or more time intervals) that may be used to define training datasets for the one or more machine-learning models. The training datasets may also include additional information usable to respond to queries received from user devices, terminal devices, external devices, etc. For example, the communication network may be configured to provide communication services on behalf of a business. The additional information may include information associated with the business, objects and/or services provided by the business, information associated with a website or webserver of the business, related businesses, etc. In some instances, the communication network may process the training datasets to reduce the received data to a minimum form that conveys the meaning of the original data. For example, preprocessing may include converting audio segments into alphanumeric strings, parsing alphanumeric strings into word segments (e.g., tokenization), and removing word segments that, while grammatically necessary, do not contribute to the meaning the data such as articles such as 'a', 'an', 'the', etc.; punctuation; etc. The artificial-intelligence data processing system may also normalize word segments (e.g., translating conjugated word segments into a non-conjugated base form, etc.) such as replacing "walking" with "walk", etc.

Alternatively, or additionally, the communication network may classify the data of the training datasets (e.g., or the reduced form of the received data) as corresponding to one or more semantic categories. Upon determining that the received data corresponds to a particular category, the received data may be replaced with the contents of the category. For example, an input phrase of "our store is open from Monday to Friday" may be classified as data pair of "store hours" and "Monday to Friday".

In still yet other instances, the communication network may include one or more machine-learning models configured to preprocess the received data. The one or more machine-learning models may be configured to convert from audio to text (e.g., convert speech into alphanumeric strings, etc.), parse natural-language alphanumeric strings into a non-natural language reduced form that is semantically equivalent, convert natural-language alphanumeric strings into an alternative format (e.g., classification as previously described, etc.), and/or the like.

Additional features may be added to the training datasets to augment the semantic meaning of the data of the training datasets and/or to provide context usable by the automated service to generate subsequent communications. The additional data may correspond to features extracted from other portions of the training dataset, features associated with a source of the training datasets (e.g., features that correspond to a data source or device, features that identify the data source, etc.), features associated with a user that generated or is associated with the data of the training datasets, an identification of a data type of the data of the training datasets, a timestamp corresponding to when the data of the training datasets was generated and/or received, combinations thereof, or the like. Returning to the previous example, the input phrase reduced to "store hours" may be augmented with an identification of the store, a location of the user that generated the received data usable to identify a location of the store, a time interval over which the store hours may be relevant to the user, etc. The automated service may use the additional information to retrieve the operating hours of the store in question.

The training datasets may be modified based on the machine-learning model that is to be trained and a target output for the machine-learning model that is to be trained. Each machine-learning model of the one or more machine-learning models may be trained to generate a particular target output. As a result, the communication network may select one or more training datasets for each machine-learning model based on the target output for that machine-learning model. The communication network may the modify the training datasets to optimally train a particular machine-learning to generate a particular target output (e.g., using a feature selection algorithm). For example, a training dataset for a first machine-learning model configured to convert speech-to-text (e.g., such as a recurrent neural network, etc.) may be modified to remove features associated with video data, etc.

The communication network may select one or more training datasets for each machine-learning model of the one or more machine-learning models. The communication network may then train the machine-learning models to generate a target output. The one or more machine-learning models may be trained over a training time interval that may be based on predetermined time interval or based on an accuracy of the machine-learning. For example, the training time interval may begin when training begins and end when a target accuracy metric is reached (e.g., accuracy, precision, area under the curve, logarithmic loss, F1 score, mean absolute error, mean square error, etc.). The machine-learning models may be trained using supervised learning, unsupervised learning, semi-supervised learning, reinforcement learning, combinations thereof, or the like. The type of training to be used may be selected based on the type of machine-learning model being trained. For instance, a regression model may use supervised learning (or a variation thereof), while a clustering model may use unsupervised learning (or a variation thereof), etc. Alternatively, the type of learning may be selected based on the target output and/or a type or quality of the training data available to train the machine-learning models.

Once the one or more machine-learning models are trained, the communication network may define processes and/or interfaces configured to connect the one or more machine-learning models to enable a single input to generate an output expected by a user device, external device, terminal device, etc. For example, the query may be a spoken query. The processes and/or interfaces enable the one or more machine-learning models to work together to, for example: translate the spoken query into natural language text using a speech-to-text machine-learning model, process the natural language text using a natural language machine-learning model into an executable query (e.g., in a structured query language, format processable by another machine-learning model, etc.), execute the query to generate a response, convert the response to natural language text using the natural language machine-learning model or another machine-learning model, convert the text to speech using a text-to-speech machine-learning model, etc. Alternatively, one or more of the aforementioned machine-learning models or algorithms may be combined into a single machine-learning model or query. The processes and/or interfaces may enable the output of one machine-learning model to be used as input into another machine-learning model by processing the output (e.g., into a different form or format) if needed, into a format expected by a next machine-learning model in the process. The communication network may define multiple processes and/or interfaces to enable the one or more machine-learning models to process different forms of communication (e.g., speech, gesture-based communications, data, text, etc.) received over different communication channels (e.g., videoconference, telephone, data, etc.). As a result, each of the processes and/or interfaces may structure the one or more machine-learning models in various configurations and sequences based on the communication channel and communications transmitted over the communication channel.

In an illustrative example, a communication network may generate a first connection context. The first connection context may be a software environment that facilitates a voice (e.g., telephonic) connection between a first device (e.g., such as a mobile device, telephone, computing device, etc.) and a second device (e.g., such as a mobile device, telephone, computing device, etc.). The connection context may facilitate the routing of communications received from the first device through the communication network to the second device and communications received from the second device through the communication network to the first device.

The communication network may receive a signal over the first voice connection indicative of a request by the first device. The request may correspond to a request to execute a command or function of the communication network that modifies the connection context.

The communication network, by executing the command or function, may connect the first device to a second connection context. The second connection context may be a software environment that facilitates communications of a same communication type as the first connection context. For example, since the first connection context facilitates voice communications the second connection context may also facilitate voice communications. Alternatively, if the first device includes alternative communication functionality (e.g., is configured to communicate using another medium such a video, text, or data, or using another communication protocol such as a data connection, etc.), the second connection context may facilitate communications of a predetermined communication type selected by the first device or the communication network. The second connection context may be configured to facilitate a second voice connection between the first device and third device (e.g., a mobile device, computing device, terminal device, server, etc. of the communication network). When the communication network executes the command or function, the first device may be disconnected from the first connection context and connected to the second connection context.

The second device may remain connected to the first connection context. In some instances, the communication network may connect an automated service configured to communicate with the first device to interact with a user of the second device and prevent the second device from disconnecting from the first connection context. Alternatively, the communication network may present media through the first connection context for the user of the second device.

The third device may be a device configured to execute functions within the communication network. Alternatively, the third device may be a device or process of the communication network. In some instances, the third device may be operated by another agent (e.g., such as a supervisory agent, a subject matter expert, etc.) that may have information requested by the second device. In other instances, the third device may operate an automated service configured to communicate using natural language (e.g., via text, video, speech, etc.) and execute function calls (e.g., API functions, remote procedure calls, etc.) to implement functionality of the communication network available to devices that operate within the communication network. While connected to the third device, the first device can implement the functionality of any device operating within the communication network (and for which the first device has the appropriate execution permissions).

The third device, via the second connection context, may receive a command interpreted from a communication received from or associated with the first device. Over a voice connection, the command may be an audio-based command (e.g., such as, but not limited to, a natural language phrase or statement). The command may be of a same type as other communications transited over the communication channel or be of a different type. For example, the first device may transmit a voice communication to the automated service requesting that the automated service identify information stored within a user profile associated with the second device. The automated service may process the communication, execute the request for information, and transmit a response voice communication that includes the requested communication (in a manner as previously described). The command may be interpreted by the third device from communications received from the first device and correspond to a function of the communication network. If the command is restricted to authorized devices, the first device may include authorization credentials with the command. Alternatively, the third device may identify the first device and/or the agent operating the first device (e.g., based on an address, Internet Protocol address, telephone number, media access identifier (MAID), voice pattern analysis, text input analysis, facial recognition, combinations thereof, or the like) and authenticate the command based on the identification.

Once the command is interpreted from the communication the third device may execute the command to implement the functionality designated by the first device. The functionality may correspond to a function the communication network and/or any device connected thereto. For example, the function may modify the first connection context (e.g., causing the second device to be connected to an automated service, causing the second device to be connected to a terminal device of the communication network, causing the second device to be connected to a user device, a mobile device, changing a communication protocol used by the communication channel such as from a public switched network (PSTN) to a transmission control protocol over Internet Protocol (TCP/IP), changing a communication channel such as from telephonic to text messaging, etc.), terminate the first connection context, generate a new connection context, present information through the first connection context to the second device such as information generated by the automated service, modify a service being provided to the second device, modify information associated with the second device, combinations thereof, or the like.

For example, a user device may connect to a communication network that provides customer service operations. The communication network may determine that the user device is to be connected to an agent that is outside the communication network using a first communication channel. The communication network may establish a first connection context and route communications through the first connection context and over the first connection channel to an external device operated by the agent. The external device may transmit a signal over the first communication channel that can be detected by the first connection context. The communication network may then pause the first connection context, disconnect the external device from the first connection context, generate a second connection context, and connect the external device to the second connection context.

The second connection context may connect the external device to an automated service, a terminal device operated by another agent or a supervisory agent, another device, etc. For example, the external device may execute commands for a request for information associated with the user device or the user thereof (e.g., such as an identification of the user device or the user thereof; an identification of a user profile associated with the user device or the user thereof; an identification of a purpose of the user device or the user thereof in connecting to the communication network such as being associated with an account, object, service, device, etc.; information associated with the account, object, service, device, etc.; combinations thereof; or the like). The second connection context may receive and execute the commands. Returning to the previous example, executing the commands may result in the requested information being communicated over the first communication channel to the external device. The external device may then transmit a signal to cause the external device to be reconnected to the first connection context. The second connection context may then be terminated.

FIG. 1 depicts a block diagram of an example voice and signaling system according to aspects of the present disclosure. Specific-purpose voice and signaling system 100 may include one or more devices connected that operate individually or as a distributed processing network to provide communication services to user devices. The one or more devices may include a hardware architecture and/or a software architecture designed to optimize performance of aspects of the present disclosure. For instance, the hardware architecture and/or a software architecture may be configured to improve throughput, establish functionality in analog or digital voice devices (e.g., telephones, etc.), load balancing, reduce connection time intervals, etc.

Voice and signaling system 100 may be configured to manage communications between one or more user devices and communication network 104. Communication network 104 may be accessible over network 106 (e.g., such as a public switched telephone network, the Internet, a wireless network, integrated services digital network, private network such as a private branch exchange, a cloud network, or the like). Communication network 104 may include hardware interface 108 configured to manage physical and/or wireless connections with external devices such as user device 144. Hardware interface 108 may be configured to route physical connections to internal components of communication network 104 such as hardware and/or software interfaces, agent devices (e.g., internal or external to communication network 104), and/or the like. Hardware interface 108 may also route physical communications to network interfaces to one or more external devices (e.g., via transceivers, gateways, the Internet, etc.). Communication interface 120 may include hardware interfaces, network interfaces, input/output interfaces, software interfaces, and/or the like configured to present communications to various devices based on a capability of the device. Communication interface 120 may select an interface based on the processing capabilities of agent device 124. For example, communication interface 120 may use a first interface for routing communications to a computing device and a second interface for routing communications to a telephone.

Com manager 112 may manage communication sessions, facilitate routing of communications and/or connections, monitor communications for executable signals, provide audio filtering, and/or the like. For instance, user device 144 may connect to communication network 104 via network 106. Hardware interface 108 may route the connection to com manager 112, which may determine whether to connect user device 144 to a particular agent device such as agent device 124 or automated service 132. During the connection com manager may detect a signal (e.g., such as single touch tone or sequence of touch tones, etc.) that corresponds to an executable function of communication network 104. Com manager may filter the signal from the connection to prevent the signal from being detected by user device 144. Com manger 112 may also facilitate execution of the function. Examples of functions include, but are not limited to, connecting agent device 124 to automated service 132, connection agent device 124 to another agent device (e.g., such as a supervisory agent, an agent knowledgeable with a certain product or service, etc.), connecting user device 144 to automated service 132, connecting user device 144 to another agent device (e.g., such as a supervisory agent, an agent knowledgeable with a certain product or service, etc.), instantiating or terminating data processing system 128 (e.g., such an artificial-intelligence data processing system as described in connection to FIG. 2), executing a query (e.g., to analytics database 140, triggers database 136), modifying the connection (e.g., increasing or decreasing a volume, adding or removing music or other media that may be presented over the connection, adding or removing filters (e.g., to reduce noise, prevent detection of signals, etc.), combinations thereof, or the like.

For example, agent device 124 may connect to communication network 104 from a non-processing device such as a telephone that may not be able to execute commands of communication network 104 (e.g., such as a touch-tone telephone, etc.). Communication network 104 may be configured to correlate a signal generate from the telephone (e.g., a touch tone or sequence of touch tones) with a function enabling agent device 124 to access the functional of communication network 124 using the telephone. Analytics database 140 may store information associated with connections between user devices and communication network 104 including, but not limited to historical connections. Analytics database 140 may be usable to identify information associated with previous instances user device 144 communicated with communication network 104, agent device 124 (or another agent device), automated services 132, and/or the like, a purpose of the connection, a resolution of the communication, and/or the like. Triggers database 136 may store an association between a signal and a corresponding function to be executed in response to detecting the signal. In some instances, the association may be contextual (e.g., based on the particular context of the connection between user device 144 and communication network 104 at the time the signal is detected) such as the time of day, an identify of user device 144 and/or the user thereof, an identity of agent device 124 and/or the agent thereof, previous signals detected during the connection, a most recent signal detected during the connection, and/or the like. Com manager 112, agent device 124, user device 144, automated service 132, or the like may dynamically define new triggers using a computing device, a webpage, voice-commands (e.g., using a natural language machine-learning model of data processing system 128, etc.), combination thereof, or the like. New triggers may be generated during the connection between user device 144 and communication network 104 (e.g., in real time) or beforehand.

Communication network 104 may be connected to data processing system 128 that includes a special purpose configured device or set of devices configured to provide machine-learning, automation, load-balancing, and other services to communication network 104. Data processing system 128 may include machine-learning models 132 (e.g., as described in connection to FIG. 2) and training data 136 for training the machine-learning models. In some instances, communication network 104 may offload execution of process to data processing system 128. Data processing system 128 may include processing hardware (e.g., one or more central processing units, memory, etc.) and software to facilitate training machine-learning models, preprocessing data from connections managed by communication network 104, post processing data output from machine-learning models 128 or from communication network 104, communicating signals generated by machine-learning models to agent device 124, combinations thereof, or the like. Machine-learning models 132 may be trained by a training subsystem using supervised learning, unsupervised learning, semi-supervised learning, transfer learning, reinforcement learning, and/or the like. Machine-learning models 132 may be trained for a predetermined time interval, a predetermined quantity of iterations, and/or until one or more accuracy metrics are reached (e.g., such as, but not limited to, accuracy, precision, area under the curve, logarithmic loss, F1 score, mean absolute error, mean square error, or the like). The training subsystem 132 may monitor signals generated by machine-learning models 132 to determine if a machine-learning model is to be retrained (e.g., reinforcement learning, additional training iterations, etc.) or if a new machine-learning model is to be instantiated and trained. For example, training subsystem 132 may monitor an accuracy metric of a machine-learning model usable to determine when to retrain or replace a machine-learning model.

Examples of machine-learning models include, but are not limited to neural networks (e.g., such as recurrent neural networks, mask recurrent neural networks, convolutional neural networks, faster convolutional neural networks, etc.), deep learning networks, you only look once (YOLO), deep learning networks, Naïve Bayes, random forest, regression models, transformers (e.g., language-based models), k-nearest neighbors, natural-language processors (e.g., speech-to-text models, text-to-speech synthesizers, etc.), decision trees, generative adversarial networks (GANs), combinations thereof, or the like.

Data processing system 128 may include one or more graphics processing units with a predetermined quantity of cores configured to modulate processing machine-learning and non-machine-learning tasks. The hardware architecture of data processing system 128 may be configured to efficiently process machine-learning tasks at the expense of generic processing tasks. Com manager 112 may be configured to route processing tasks based on the type of processing tasks to distribute a processing load of communication network 104. In some instance, com manager 112 may be configured to route machine-learning tasks to data processing system 128 and non-machine-learning tasks may be processed by processors of communication network 104. Data processing system 128 may transmit signals output from by machine-learning models 132 to com manager 120. In some instances, data processing system 128 may also transmit accuracy information such as confidence values, prediction probabilities, metadata, etc. that may qualify the signals. For example, dynamic-action system 504 may condition execution of one or more signals based on the output from a machine-learning model and the corresponding accuracy information.

For example, agent device 124 may transmit a signal over the connection between communication network 104 and user device 144. Com manager 112 may detect the signal and identify the function that corresponds to the signal. The function may include execution of a machine-learning model to process a portion of natural language communications transmitted by user device 144 (e.g., such voice communications received within the last n seconds of the connection from when the signal is received). Com manager 112 may facilitate execution of the function may transmitting the portion of the natural language communication to data processing system 128, which may process the portion of the natural language communication using machine-learning model 132. For instance, the machine-learning model may generate a text representation of the portion of the natural language communication, generate a prediction of an intent or purpose associated with the portion of the natural language communication, generate a predicted meaning of the portion of the natural language communication, translate the portion of the natural language communication into a different language, combinations thereof, or the like. Data processing system 128 may generate a response using machine-learning models 132 and return the response to com manager 112. Com manager 112 may then route the response to agent device 124. If the response is in a format that cannot be presented to agent device 124 (e.g., such as visual data if agent device 124 lack a display), then the response may be translated or formatted into a format that can be presented by agent device 124.

Figure 2:
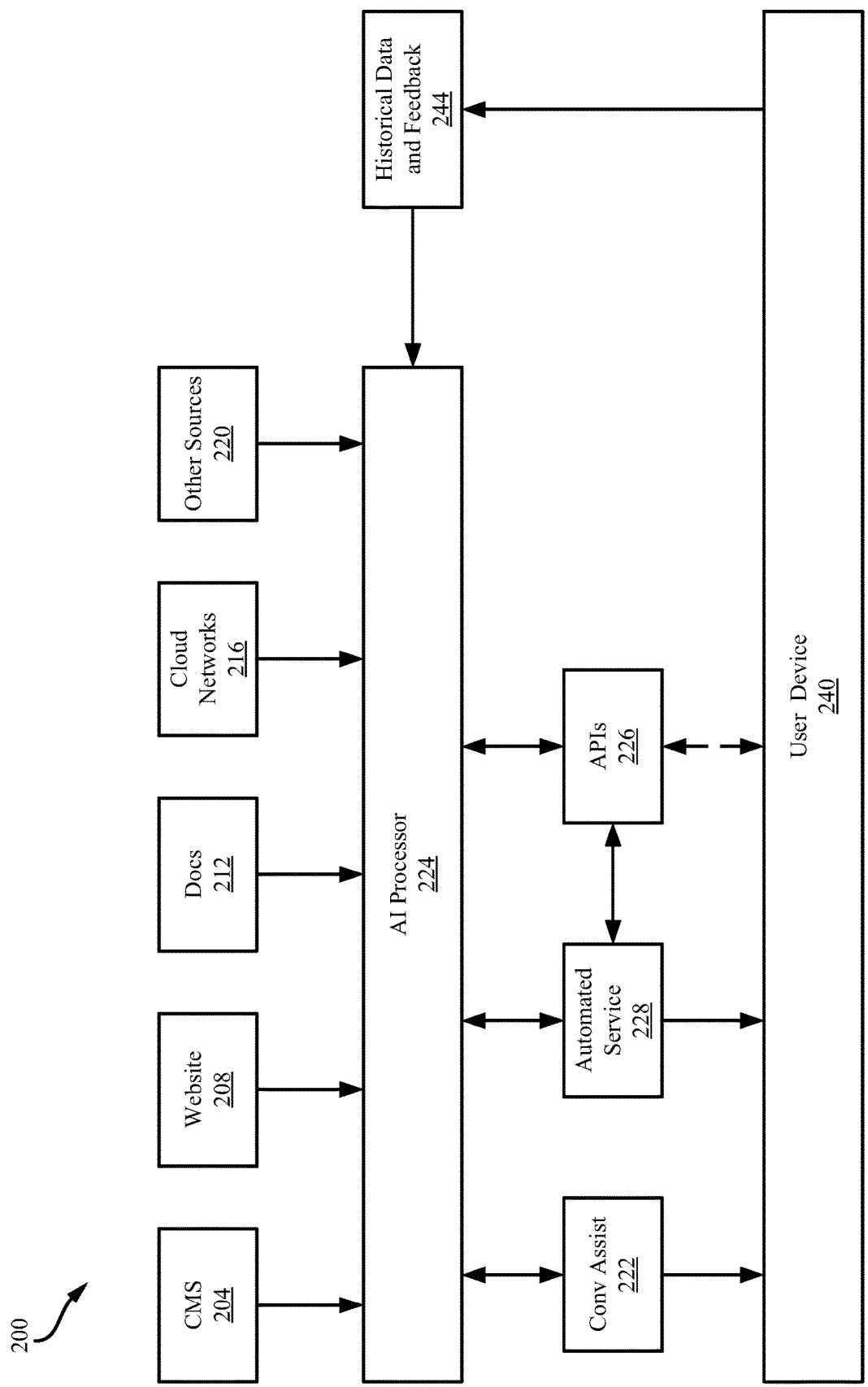
FIG. 2 depicts a block diagram of an example artificial-intelligence data processing system of a communication network according to aspects of the present disclosure.

FIG. 2 depicts a block diagram of an example artificial-intelligence data processing system of a communication network according to aspects of the present disclosure. Communication network 200 may be configured to facilitate and maintain communications between an agent of communication network 200 and an automated service, between an agent of communication network 200 and a user, between a user of communication network 200 and an automated service, and/or the like. Communication network 200 may include one or more computing devices (e.g., terminal devices, mobile devices, telephones, desktop or laptop computers, servers, databases, etc.) operated by one or more agents. In some instances, agents may connect to communication network 200 from a remote device. In those instances, communication network 200 may operate as a communication router that facilitates the connection and routing of communications to and from the agent. User devices (e.g., operated by users) may connect to the communication network a variety device types and functionality to request assistance to perform an action (e.g., execute a query for information, pay a balance, connect to a customer service agent, etc.).

Communication network 200 may receive data from a variety of disparate information sources for use training and executing automated services and agents to communicate and provide information to users. Examples of information sources include, but not limited to, content management systems 204, websites 208, documents 212 (e.g., via a document management system, concurrent versioning system, file system, database, etc.), cloud networks 216, communication networks (e.g., one or more devices configured to facilitate communications over one or more communication channels between users and other users and/or between users and agents), terminal devices (e.g., devices configured to communicate with user devices, etc.), other sources 220 (e.g., analytics services, Internet-of-Things (IOT) devices, databases, servers, any other information source or storage device, etc.), and/or the like. Communication network 200 may also receive communications from devices that use communication network 200 to facilitate communications.

The manner in which communication network 200 receives data from data sources 204-120 may be based on the data source. For example, some data sources such as IoT devices may transmit a data stream to which communication network 200 may be connected. For some data sources, communication network 200 may transmit a request for particular data and/or for datasets stored by a data source. Communication network 200 may transmit requests in regular intervals (e.g., such as a batch request to one or more data sources, etc.), upon detecting or being notified of new data, and/or the like. For some data sources. communication network 200 may use one or more APIs exposed by a data source to access data generated or stored by data source. For some data sources, communication network 200 may instantiate a process configured to scrape data from a data source (e.g., such as web crawler, etc.). The process may execute to access and transmit data of a data source to communication network 200. In some instances, data sources may transmit data to communication network 200 each time new data is generated and/or stored by the data source.

Data of a data source can include any type of information. Some data may correspond to information associated with an object, entity, or topic, that may be requested by a user. Some data sources may store records, documents, files, or the like. For example, a data source may store a record of a conversation (e.g., in an audio format, alphanumeric format, or the like) between a user and an agent. Another data sources may store sensor data from one or more connected sensors (e.g., such as motion sensors, temperature sensors, etc.).

Data from data sources may be received by AI processor 224. AI processor 224 may be configured to process the data into a format usable by one or more conversation services (e.g., automated services 228, conversation assist 232, APIs 236, and/or the like) and/or information-distribution services. AI processor 224 may include one or more devices, processes, machine-learning models, and/or the like configured to process received data into a unified data type. The unified data type may store the sematic information of any received data regardless of the data type of the received data.

AI processor 224 may preprocess the data to convert the received data into one or more general formats from which AI processor 224 may generate the unified data type for the data. AI processor 224 may identify a data type associated with the received data (e.g., based on identifying audio data, video data, alphanumeric strings, a particular file type extension, etc.) and allocate a process and/or machine-learning model capable of processing the identified data type. For example, if the received data includes audio segments from voice communications, AI processor 224 may allocate a machine-learning model configured to process audio segments into alphanumeric strings (e.g., a speech-to-text translation, audio classification, etc.). For video segments AI processor 224 may allocate machine-learning models configured to classify images, perform object detection, etc. AI processor 224 may then store the preprocessed data in a unified data type.

In some instances, AI processor 224 may augment the preprocessed data by adding additional features corresponding to contextual information, metadata, etc. to the unified data type. For example, AI processor 224 may identify contextually relevant information based on, but not limited to, information associated with the origin device from which the data was transmitted and/or a user thereof (e.g., such as, but not limited to, demographic information, location information, an identification of hardware and/or software included within the origin device, an Internet Protocol (IP) address, a media access control address (MAC), etc.), information associated with the communication that included the information (e.g., such as an IP address, a MAC address, an identification of an origin location of the communication, an identification one or more servers through which the communication traveled, a data size, a quantity of packets, a packet size, etc.), information associated with preceding or subsequently received data, information associated with linked data (e.g., data referenced by the data to be stored in the unified data type, or data that references the data to be stored in the unified data type, etc.), and/or the like. AI processor 224 may extract features from the augmented data to add to the preprocessed data. Alternatively, or additionally, AI processor 224 may determine which features to add to the preprocessed data based on a classification of the data to be stored within a unified data type (e.g., such as audio or text-based conversation data, video data, information data, etc.).

AI processor 224 generate a unified data type from the augmented, preprocessed data. The unified data may include a data structure configured to store a set of data of any data type. The unified data type may store the augmented, preprocessed data according to a defined structure that can be processed by automated services 228, conversation assist 232, and API's 236. In some instances, the defined structure may include a set of field-value pairs in which a field includes metadata descriptors indicating a context associated with the corresponding value. A processing service may read the fields to determine how to process the unified data structure based on the fields. For example, a unified data type storing audio communications may include a field indicating that the corresponding value is storing text derived from audio segments and another field indicating that the corresponding value is storing semantic information associated with the audio communications. Alternatively, the data structure may store data in a predefine sequence in which each field of the data structure may store a particular type of data. If the field is null, then the unified data type is not storing data of that type. The unified data type, being configured to store data of any type, may include a set of null fields and a set of non-null fields in which the null fields and non-null fields may vary based on the particular data being stored. Since the sequence is predetermined, a service that processes unified data types may determine what is stored in a unified data type based on the location along the sequence in which the data is stored.

Unified data types may be assigned one or more identifiers. The identifiers may be used to address particular unified data types, reference particular unified data types, search for particular unified data types or sets of particular unified data types, and/or the like. In some examples, an identifier of the one or more identifiers may include a reference to a memory address in which the unified data type is stored. The identifier may be generated using a hash of the unified data type or one or more features of the unified data type. Alternatively, once the unified data type is stored, AI processor 224 may identify the memory address and store the memory address in association with the unified data type. Other identifiers may include a description of the data stored by the unified data type, one or more classifications associated with the unified data type (e.g., such as the original data type of the data stored by the unified data type, etc.), a universally unique identifier (UUID) generated for the unified data type, and/or the like.

AI processor 224 may receive requests for information from automated service 228, conversation assist 232, and APIs 236. Automated service 228 may include one or more processes, machine-learning models, and/or devices configured to communicate with user devices, terminal devices, other device, and/or other automated services. Automated service 228 may communicate with agent device 240 over a communication channel through a communication network. During a communication session, automated service 228 may receive a communication from agent device 240 and generate and transmit a response to the agent device 240 using a same or communication type as the received communication. In some instances, automated services 228 may be configured to communication in a manner such that a user or agent operation agent device 240 may not detect that automated service 228 is not a human. For example, automated service 228 may be configured to generate responses that are based on a same orthography and/or communication convention (e.g., language, diction, grammar, slang, abbreviations, etc.) as used by the user or agent. Alternatively, automated service 228 may be configured to generate responses that are based on an orthography and/or communication convention commonly used for the communication channel of the communication session and demographic information associated with the user or agent (e.g., location of the user or agent, age, etc.).

Automated service 228 may be configured to communicate over an audio interface (e.g., a telephone call, etc.), a video interface (e.g., video conference, etc.), one or more textual interfaces (e.g., text messaging, instant messaging, email, direct messaging, and/or the like), or the like. Automated service 228 may request information from AI processor 224 during a communication session with a user and/or other automated service. For example, during the communication session, a user may ask a question. Automated service 228 may parse the question to determine a question type, identify information that will resolve the question, an interface type of the interface through which automated service 228 is communicating with the user or other automated service, and/or one or more contextually relevant features that may increase an accuracy of the response that will be generated by automated service 228. Automated service 228 may then execute a query to automated processor 228 for the information.

AI processor 224 may receive the query and identify one or more unified data types that include the requested information. In some instances, AI processor 224 may generate a confidence value for each of the one or more unified data types that include the requested information. The confidence value may be generated based on a degree in which the uniform data type matches the query (e.g., based on a quantity of features of the uniform data type that correspond to the query, or the like). AI processor 224 may then rank the one or more uniform data types and identify a particular uniform data type having a highest confidence value. Alternatively, AI processor 224 may identify a set of uniform data types of the one or more uniform data types having a confidence value greater than a threshold.

AI processor 224 may then translate the particular uniform data type (or the set of uniform data types) into a representation that can be transmitted via the communication channel connecting user device 220 to automated service 228. For example, if the user is communicating with automated service 228 via a telephonic interface (e.g., voice-based communications, etc.), then AI processor 224 may translate the particular uniform data type into one or more alphanumeric strings that include a conversational representation of the information with a diction, grammar, etc. that is conventional to telephonic communications. AI processor 228 may then translate the one or more alphanumeric strings into a synthetic voice representation that may be presented to the use by automated service 228. Alternatively, AI processor 224 may pass the one or more alphanumeric strings to automated service 228 and automated service may generate the synthetic voice representation of the one or more alphanumeric strings (e.g., using a speech-to-text process, machine-learning model, etc.).

In some instances, automated services 228 may include a sequence of machine-learning models that operate together to process incoming communications, generate responses, and transmit the responses to the user or agent over the same communication channel over which the incoming communications were received. The machine-learning models may be trained using training datasets derived from unified data types that correspond to communications transmitted over communication channels. Each training dataset may include a sequence (e.g., ordered) or set (e.g., unordered) of data usable to train a particular machine-learning model (e.g., recurrent neural network, Naive Bayes, etc.) to generate a target output (e.g., predictions, classifications, image processing, audio processing, video processing, natural language processing, etc.).

In some instances, additional features may be added to the training datasets to augment the semantic meaning of the data of the training datasets and/or to provide context usable by the automated service to generate subsequent communications. The additional data may correspond to features extracted from other portions of the training dataset, features associated with a source of the training datasets (e.g., features that correspond to a data source or device, features that identify the data source, etc.), features associated with a user that generated or is associated with the data of the training datasets, an identification of a data type of the data of the training datasets, a timestamp corresponding to when the data of the training datasets was generated and/or received, combinations thereof, or the like.

AI processor 224 may select one or more training datasets for each machine-learning model based on the target output for that machine-learning model. The communication network may the modify the training datasets to optimally train a particular machine-learning to generate a particular target output.

The AI processor 224 may then train the machine-learning models to generate a target output. The one or more machine-learning models may be trained over a training time interval that may be based on a predetermined time interval or based on a target accuracy of the machine-learning model. For example, the training time interval may begin when training begins and end when a target accuracy metric is reached (e.g., accuracy, precision, area under the curve, logarithmic loss, F1 score, mean absolute error, mean square error, etc.). The machine-learning models may be trained using supervised learning, unsupervised learning, semi-supervised learning, reinforcement learning, combinations thereof, or the like. The type of training to be used may be selected based on the type of machine-learning model being trained. For instance, a regression model may use supervised learning (or a variation thereof), while a clustering model may be trained using unsupervised learning (or a variation thereof), etc. Alternatively, the type of learning may be selected based on the target output and/or a type or quality of the training data available to train the machine-learning models.

Once the one or more machine-learning models are trained, the co AI processor 224 may define processes and/or interfaces configured to connect the one or more machine-learning models to enable a single input to generate an output expected by agent device 240. For example, a query may be received over a telephonic communication channel. The processes and/or interfaces enable the one or more machine-learning models to operate together to, for example: translate the query into natural language text using a speech-to-text machine-learning model, process the natural language text using a natural language machine-learning model into an executable query (e.g., in a structured query language, format processable by another machine-learning model, etc.), execute the query to generate a response, convert the response to natural language text using the natural language machine-learning model or another machine-learning model, convert the text to speech using a text-to-speech machine-learning model, etc. Alternatively, one or more of the aforementioned machine-learning models or algorithms may be combined into a single machine-learning model. The processes and/or interfaces may enable the output of one machine-learning model to be used as input into another machine-learning model by processing the output into a different form or format (e.g., if needed) and into a format expected by a next machine-learning model in the sequence. The AI processor 224 may define multiple processes and/or interfaces to organize the one more machine-learning models into difference sequences configured to process different forms of communication (e.g., speech, gesture-based communications, data, text, etc.) received over different communication channels (e.g., videoconference, telephone, text, data, etc.). As a result, each of the processes and/or interfaces may structure the one or more machine-learning models in various configurations and sequences based on the communication channel and communications transmitted over the communication channel.

Conversation assist 232 may include one or more processes and/or devices configured to assist a human agent during a communication session between a user and an agent or automated service 228 and an agent. Conversational assist 232 may be an automated service with a modified output layer that presents one or more outputs of an automated service to the human agent. The human agent may then select an output from the one or more outputs and present it to the user. As a result, during a communication session, conversation assist 232 may operate in a same or similar manner as automated service 228.

For example, conversation assist 232 may analyze received communications from a user or automated service 228 that is communicating with the agent to determine one or more appropriate responses to the received communications. Conversation assist 224 may transmit queries to AI processor 224 for information needed to generate particular responses (in a same or similar manner as previously described). AI processor 224 may identify the unified data types storing the information and translate the information into a format native to the communication channel of the communication session. When a response is defined, conversation assist 232 may present the response to the agent as a suggested response. The response may include a simplified response such as a shorthand that can be translated by the agent into a conversational response. Alternatively, the response may be presented as a formal conversation response (e.g., including a particular sentence structure, wording/phrasing, grammar, punctuation, etc. that is native to the communication interface being used). The agent may select from among one or more suggested responses to present a suggested response to the user or automated service 228. Alternatively, the agent may present a response defined by the agent. The response may be presented to the user as if the response was generated by the agent (e.g., the agent may speak the response or the response may be written out as if from the agent, etc.).

In instances in which multiple responses are generated, conversation assist 232 may rank or score each response so as to provide the agent with options that may be selectively presented over the communication session. The rank or scores may be based on one or more algorithms configured to maximize a probability that particular event will occur (e.g., such as resolving a user issue or complaint, providing a response to a query, causing the user to sign up for a service, causing the user to generate a new profile, cause the user to purchase an item, etc.). A score may include a probability value corresponding to the probability that a particular event may occur if a particular response is selected, an indication in which the probability value will change if a particular response is selected, etc.

APIs 236 may include a set of interfaces exposed to agent device 240, automated services 228, and/or other devices authorized to access AI processor 224. The set of interfaces may allow agent device 240 to execute functions of AI processor 224, such as, but not limited to establishing communications between agent device 240 and other devices or services, establish connection contexts, modify connection contexts, execute queries for information stored in unified data types, etc. The APIs may be wrapped within an application configured to execute functions of the APIs. Alternatively, the application may connect to APIs 236 or execute remote calls to the functions of APIs 236. The application may include graphical user interfaces and/or command line interfaces that enable client device 240 to selectively execute the functions of APIs 236. APIs 236 may include one or more APIs accessible via different interface types usably by client device 240.

In some instances, APIs may be accessible to devices operating within a same communication network as AI processor 224 (e.g., terminal devices, etc.). Devices outside the communication network may lack the capability and/or authorization to access APIs. External devices may connect to automated service 228 and request the execution of functions of AI processor 224. Automated service 228 may receive the request, determine if the request should be authorized (e.g., based on the requesting device and/or a user thereof, etc.), and define one or more function calls from APIs 236 that will implement the requested functionality.

Agent device 240 may generate one or more metrics corresponding to the communication session between agent device 240 and/or an agent thereof and a user device and/or a user thereof, agent device 240 and automated service 228, automated service 228 and another automated service 228, agent device 240 operating conversation assist 232 and a user device or automated service 228, agent device 240 and AI processor 224 via APIs 236, a user device and automated service 228, and/or any other communications of a service involving AI processor 224. The one or more metrics may be manually generated (e.g., by a user, agent, or the like) and/or automatically generated (e.g., by a communication application, automated service 228, conversation assist 232, AI processor 224, etc.) based on the occurrence of events during the communication session, an analysis of communications transmitted and/or received, a satisfaction of the user or agent, etc. For example, the one or more metrics may include an indication of an accuracy of a response to a communication transmitted by a user or agent (e.g., indicating a degree with which AI processor 224 identified the correct information), a degree in which communications conformed to the communication channel used for the communication session (e.g., indicating whether communications used an appropriate conversational standard associated with the communication channel), and/or the like. The one or more metrics may be transmitted to historical data and feedback 244.

Historical data and feedback 244 may store records of communication sessions (e.g., the one or more metrics, communications transmitted to and/or received by client device 240, feedback from the user, feedback from the agent, feedback from the automated service 236, and/or the like) between agent device 240 and user devices. Historical data and feedback 244 may use the records of one or more communication sessions to define one or more feature vectors usable to train the machine-learning models of AI processor 224. The feature vectors may be used for reinforcement learning and/or to train new machine-learning models based on the historical communications and the one or more metrics and/or feedback generated from those communications. In some instances, labels may be derived from the one or more metrics and/or feedback generated from the communications for supervised learning, semi-supervised learning, reinforcement learning, etc.). Machine-learning models may be trained for predetermined time interval, for a predetermined quantity of iterations, until a predetermined accuracy metric (e.g., accuracy, precision, area under the curve, logarithmic loss, F1 score, mean absolute error, mean square error, etc.) is reached, and/or the like. The one or more metrics and/or feedback may be used to determine an on-going quality of the output of a machine-learning model. If the one or more metrics and/or feedback indicate that the quality of a machine-learning model is below a threshold, then historical data and feedback 244 may retrain the machine-learning model, instantiate and train a new machine-learning model, and/or the like.

In some instances, the feature vectors may be used for reinforcement learning and/or other types of on-going learning. In those instances, a trained machine-learning model used during a communication session to generate a response (e.g., by translating a uniform data type into a conversational response native to a particular communication channel), may execute a reinforcement-learning iteration using the feature vector used to generate the response, the one or more metrics, and one or more thresholds to qualify the one or more metrics. The reinforcement-learning iteration may adjust internal weights of the machine-learning model to bias the machine-learning model towards or away from generating particular responses. If the one or more metrics associated with a response are high relative to the one or more thresholds (e.g., indicating the response is correlated with a good or accurate result), then reinforcement learning may bias the machine-learning model to generate responses similar to that response. If the one or more metrics associated with a response are low relative to the one or more thresholds (e.g., indicating the response is correlated with a poor or inaccurate result), then reinforcement learning may bias the machine-learning model to generate responses different from that response.

Figure 3:
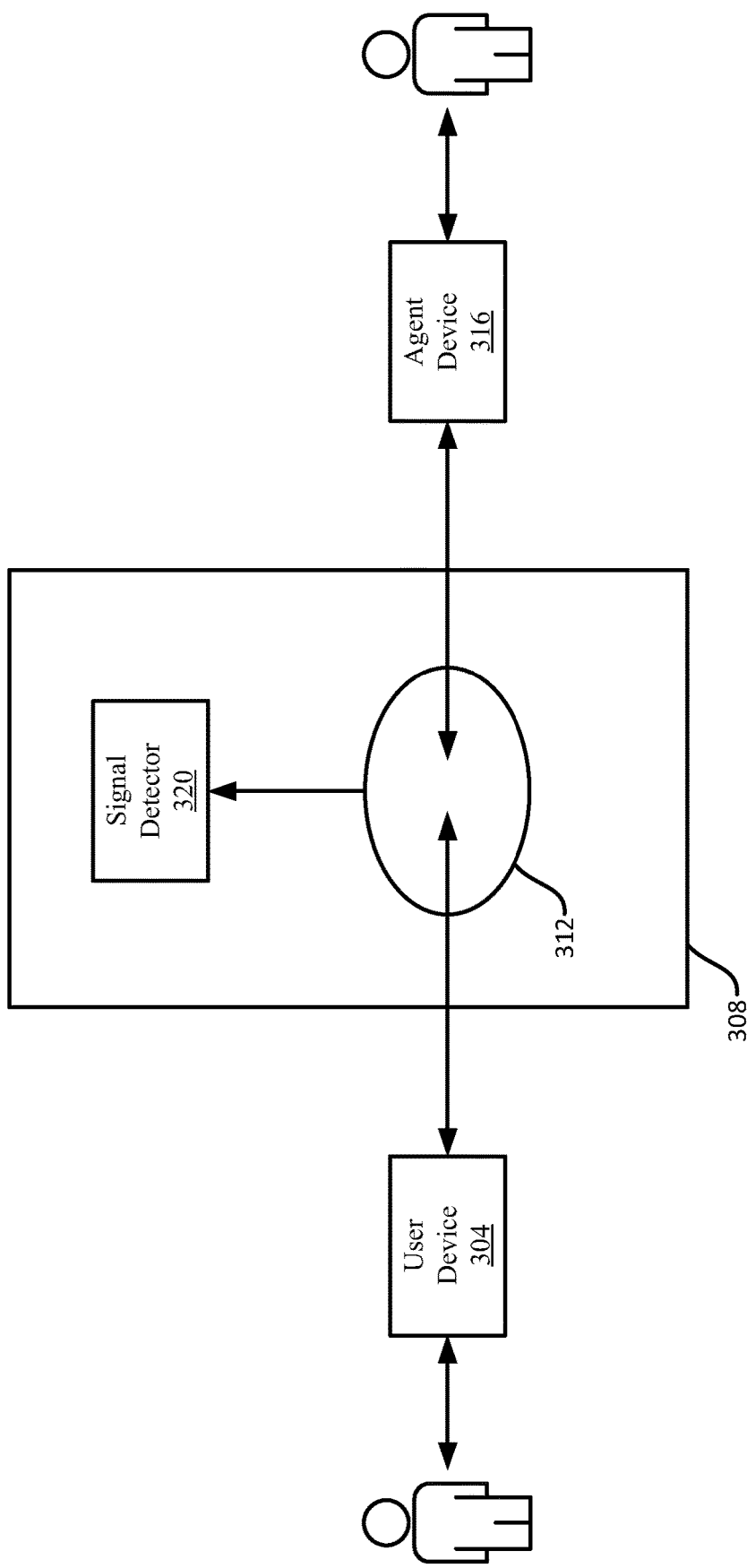
FIG. 3 depicts a block diagram of combined voice and signaling of an example communication network configured to expand features of the communication network according to aspects of the present disclosure.

FIG. 3 depicts a block diagram of combined voice and signaling of an example communication network configured to expand features of the communication network according to aspects of the present disclosure. User device 304 may connect to communication network 308 to establish a communication session associated with a product or service provided by the communication network 308 or a client of communication network 308. User device 304 may connect to communication network 308 using a first communication channel selected based on a capability of user device 304. For example, if user device 304 is a telephone, then user device 304 may connect to communication network 308 over a telephonic-based communication channel. If user device 304 is a mobile device such as a smartphone, then user device 304 may determine whether to connect to communication network 308 via a telephonic-based communication channel or another communication channel (e.g., a text messaging communication channel, a webservice, a data connection, video conference, imaging, etc.).

Communication network 308 may identify an agent that can provide services to user device 304. The agent may operate a terminal device within communication network 308 to connect to connection context 312 to communicate with user device 304. Alternatively, the agent may operate another device that is separate from communication network 308 (e.g., such as when agent is remote from communication network 308, etc.). In some instances, communication network 308 may use information associated with user device 304 and/or the user thereof to identify an agent such as, but not limited to, demographic information, an identifier associated with user device 304, an IP address of user device 304, a hardware and/or software included within user device 304, a cookie, whether user device 304 and/or the user thereof previously connected to communication network 308 or communication with a particular agent, combinations thereof, or the like. Alternatively, or additionally, communication network 308 may use a purpose provided by user device 304 indicating why user device 304 connected to communication network 308.

In some examples, communication network 308 may determine that the agent of agent device 316 should be connected to connection context 312. Communication network 308 may transmit a notification to agent device 316 to request (or command) agent device 316 connect to connection context 312. Agent device 316 may be operated by an agent of communication network 308 that may be temporarily or permanently located outside communication network 308. For example, if user device 304 previously connected to communication network 308 and communication with an agent of agent device 316 resulting in positive feedback, then commination network 308 may attempt to connect user device 304 to that agent again. Since the agent is external from communication network 308, the agent may operate agent device 316 to connect to connection context 312. In another example, an agent may get disconnected from connection context 312 due to hardware or software fault and reconnect to connection context 312 using agent device 316.

Agent device 316, being separate from communication network 308, may lack the capabilities of devices of communication network 308. Communication network 308 define signal detector 320 based on the capabilities of the communication channel and connect it to connection context 312. Signal detector 320 may be defined to detect a signal over the communication channel. Each communication channel may have different features depending on the type of communications configured to be transmitted over the communication channel (e.g., such as just audio, just video, audio and video, data, etc.). signal detector 320 may be configured to detect a signal within communications transmitted over the communications. For example, for telephonic-based communications (e.g., just audio), signal detector 320 may be configured to detect an audio segment transmitted over the communication channel. For video or audiovisual communications channels, the signal may be embedded into a video frame or image (e.g., such as a watermark, or the like). Signal detector 320 may be defined to particular types of signals depending on the types of communications transmitted over the commination channel. In some instances, such as when more than one communication channel is established or more than one connection contexts, communication network 308 may define multiple signal detectors 320.

The signal may have predetermined characteristics to improve signal detection, prevent interference with other communications being transmitted over the communication channel, etc. For example, the signal may be distinct from other communications transmitted over the communication channel (e.g., such as having a distinct frequency, intensity, etc.) to improve the likelihood that signal detector 304 may detect the signal. In some instances, the signal transmitted in a way so as to reduce a likelihood that user deice 304 or agent device 316 will detect the signal. In those instances, the signal may be transmitted outside an audible frequency range (e.g., greater than 30 kHz) or embedded as a watermark within an image, video, and/or audio. Alternatively, or additionally, connection context 312 may include one or more bandpass filters configured to filter out signals within a predetermine frequency range. The one or more bandpass filters may be positioned within the connection context so as to filter a signal received from user device 304 from reaching agent device 316 and a signal received from agent device 316 from reaching user device 304.

Signal detector 320 may transmit a notification to communication network 308 indicating that a signal has been detected over the communication channel. The notification may include an identification of the connection context, an identification of the devices connected to the connection context, an identification of the device that transmitted the signal, an identification of the signal, and/or the like. Communication network 308 may then execute an action based on the received signal. In some instances, the signal maybe interpreted into a function call or command. In other instances, commination network 308 may use a lookup table that indicates for a received signal, an action that is to be performed.

FIG. 4A depicts a block diagram of combined voice and signaling of an example communication network that executes functions that manage multiple, concurrent communication channels in response to a received signal according to aspects of the present disclosure. User device 404 may connect to communication network 408 to establish a communication session with agent device 416 over a first communication channel. Agent device 416 may not be operating within communication network 408 or may be a device with limited functionality, and as a result, may lack the permission or the capability to invoke functions of communication network 408. Agent device 416 may still invoke functions of communication network 408 by embedding signals within the first communication channel 412 that can be detected and interpreted by communication network 408. For example, the signal may cause communication network 408 to: execute one or more functions, establish new connection contexts, route communications, execute queries for information, etc.

Since agent device 416 may have limited functionality, agent device 416 may embed signals that may be of a same type as other communications transmitted over the first communication channel. For example, if the first communication channel is a telephone connection in which the communications are audio-based (e.g., voice, etc.) communications, the signal may be an audio signal. The signal may be transmitted using a frequency that is outside the range of human hearing to avoid the signal from interfering with other communications transmitted over the first communication channel. Alternatively, the signal may be transmitted using frequency within human hearing. First connection context 412 (and other connection contexts) of communication network 408 may include one or more bandpass filters configured to filter particular sets of frequencies. For example, first connection context 412 may include a bandpass filter that filters signals transmitted from agent device 416 from reaching user device 404. First connection context 412 may include a (same or different) bandpass filter that filters signals transmitted from user device 404 from reaching agent device 416.

The signal may include a single frequency (e.g., a single tone) or multiple frequencies (e.g., that each can be interpreted as a data point). For example, the signal may include a first frequency to represent a zero and a second frequency to represent a one. Alternatively, the ones and zeros can be represented by varying an intensity of the signal (e.g., the amplitude of the signal). The signal may represent a sequence of one's and zero's that can make up a binary message that can be read by communication network 408. The binary message may be an instruction that can be executed or may be interpreted by communication network 408 as corresponding to function that can be executed. In some instances, additional information can be embedded into the signal by using more than two frequencies (with each frequency representing a discrete data value) or more than two intensities (with each intensity representing a discrete data value).

Agent device 416 may transmit a first signal to communication network 408. Signal detector 432 may detect the signal and transmit an interrupt to communication network 408 notifying communication network 408 of a signal to process. The notification may include an identification of the detected signal. For example, if the signal corresponds to a single tone, then the notification may include an identification of the signal tone (e.g., by frequency or an identifier that correspond to the frequency). If the signal includes a binary or more complex signal, then the notification may include the decoded message (e.g., the binary message, etc.). Communication network 408 may then determine an action to perform based on the notification. For example, as shown, the signal may be a request to establish second connection context 420 the enable a connection between agent device 416 and automated agent 424.

Communication network 408 may establish second connection context 420 the enable a second communication channel between agent device 416 and automated agent 424. Agent device 416 may be disconnected from first connection context 412 and connected to second connection context 420. Second connection context 420 be an environment of communication network 408 that facilitates communications between one or more devices or services. Second connection context 420 may include signal detector 436 which may detect signals transmitted over the second communication channel from agent device 416 or another device connected to second connection context 420.

Automated service 424 may be a software-based agent (e.g., a communication bot), configured to interact with agent device 416 using natural language communications. Since agent device 416 may include limited functionality, communication network 408 may instantiate an automated agent configured to communicate with agent device 416 given the capabilities of agent device 416. As a result, the second communication channel may be of a same type as the first communication channel, which in this example, may be a telephonic-based communication channel. Automated service 416 may include one or more machine-learning models configured to parse received natural language speech, determine an appropriate response, and transmit the appropriate response using a natural language response in a synthetic voice over the second communication channel (as previously described).

Automated service 424 may be configured to operate as an execution environment for agent device 416 capable of executing commands received as speech or as natural language speech. The agent of agent device 416 may ask the automated service to perform functions on behalf of agent device 416. Examples of requests that may be communicated to automated service include, but are not limited to, a request to present media to user device 404 over the first communication channel via first connection context 412, to connect the agent to an agent device operated by a supervisory agent via second connection context 420, to connect the user to an agent device operated by a supervisory agent via first connection context 412, to reconnect agent device 416 to first connection context 412, to place agent device 416 in work mode (e.g., such that agent device 416 may receive subsequent communications from other user devices facilitated by communication network 408, etc.), to place agent device 416 in after work mode (e.g., such that agent device 416 may not receive subsequent communications from other user devices facilitated by communication network 408, etc.), or the like. For example, agent device 416 may transmit communications over the second communication channel to cause automated service 424 to obtain information associated with user device 404 and/or the user thereof, which may be available to devices within the communication network 408 (e.g., such as information available over an intranet or within a local database) or devices that have additional functionality over agent device 408.

First connection context 412 may be paused while agent device 416 is connected to second connection context 420. In some instances, communication network 408 may present media (e.g., such as music, video, text, games, etc.) through first connection context to reduce a likelihood that user device 404 may disconnect from communication network 408. The media may be selected based on information associated with user device 404 and/or the user thereof that may be stored in communication network 408 or that may be obtained from user device 404 and/or the user thereof. The media may also be selected based on a type of communication that can be transmitted over the first communication channel. For instance, if the first communication channel is telephonic-based, then the auditory media may be selected.

In other instances, communication network 408 may instantiate automated service 428 and connect automated service 428 to first connection context 412. Automated service 428 may be a software-based agent (e.g., a communication bot), configured to interact with user device 428 using natural language communications of type that can be transmitted over the first communication channel (as previously described). Automated service 428 may have less fewer permissions than automated service 424 to prevent user device 404 from having unauthorized access to communication network 408. Automated service 428 may be configured to have a conversation with user device 404 and/or the user thereof and execute queries for information that is authorized for both public distribution and for distribution to user device 404 and/or the user thereof. Automated service 424 may be prevented from executing other functions of communication network 408 to ensure the integrity and security of communication network 408 and information stored therein.

User device 404 may transmit signals over the first communication channel which may be detected by signal detector 432. When signal detector 432 detects a signal, signal detector 432 may transmit an interrupt with a notification to communication network 408. The notification may include an identification of a source of the signal (e.g., user device 404) and an identification of the signal. Communication network 408 may determine if user device 404 and/or the user thereof is authorized to execute the functions identified by the notification. If so, communication network 408 may execute the functions based on the signal. Since user device 404 and/or the user thereof may have limited or no permissions, commination network 408 may be configured to execute limited functions received from user device 404. Examples of functions that can be executed by user device 404 include, but are not limited to, terminate first connection context 412, transmit a message to agent device 416 (e.g., through connection context 420 over the second communication channel, request information associated with user device 404 and/or the user thereof, request information associated with a product or service of communication network 408 or a client thereof, request information associated with a physical location (e.g., such as store hours, location, products or services offered) associated with of communication network 408 or a client thereof, request a connection with a supervisory agent, request a connection with a subject matter expert (e.g., such as a billing or account management agent, an expert agent for a particular product or service, a customer service agent, etc.), and/or the like.

In some instances, user device 404 and/or the user thereof may not include an identification of the protocols associated with signals or may not include an identification of which signals correspond to which functions of communication network 404. User device 404 may transmit a request to automated service 428 to execute of functions (for which user device 404 and/or the user thereof has permissions to execute). In some instances, when user device 404 transmits a request to execute a function, automated service 428 may transmit a notification to automated service 424 with an identification of the request. Automated service 424 may transmit a notification to agent device 416 allow agent device 416 to allow or deny the request. Automated service 424 may transmit a response to automated service 428 indicating a result of the request (e.g., approval, denial, an indication that the function was executed and a result of the execution, etc.), which may be presented to user device 404.

FIG. 4B depicts a block diagram of combined voice and signaling of an example communication network that executes functions managing concurrent communications between users, agents, and automated services in response to received signals according to aspects of the present disclosure. Agent device 416 may transmit a signal via the first communication channel or the second communication channel to facilitate the execution of functions of communication network 408. For example, agent device 408 may transmit a signal that can be detected by signal detector 432 to establish second connection context 420. Signal detector 432 may transmit an interrupt with a notification to communication network 408 based on the signal. Communication network 408, upon receiving the interrupt and notification, may establish second connection context 420, disconnect agent device 416 from first connection context 412, and connect agent device to second connection context 420 via a second communication channel (e.g., that may be of a same type or a different type from the first communication channel). Communication network 408 may instantiate and connect automated service 424 to second connection context 420 to enable communications between automated service 424 and agent device 416. Automated service 424 may operate as an execution environment by allowing agent device 416 to transmit commands (e.g., as natural language speech, as spoken commands, etc.) the execution of which can be facilitated by automated service 424.

In some instances, the signal transmitted by agent device 424 may be interpreted to include (or may include) a request to connect agent device 416 to another agent device such as agent device 440. Alternatively, agent device 416 may transmit a request to automated service 424 to add another device to second context 420. For example, agent device 416 may request to communicate to a supervisory agent, a subject matter expert, etc. that may be operating agent device 440. Like agent device 416, agent device 440 may be a terminal device operating within communication network 408 or a device operating outside of communication network 408. Communication network 408 may transmit a notification to agent device 440 or to another device operated by a user of agent device 440. The notification may include an indication that agent device 440 is requested to connect to second connection context 420, an identification of a source of the request (e.g., agent device 408), a context associated with the request to connect to second connection context 420 (e.g., a reason in which agent device 440 is requested to join connection context 420), etc.

Agent device 440 or the user thereof may receive the notification and connect to communication network 408. Agent device 440 may provide an identification of second connection context 420 and in some examples, access credentials (e.g., an identification of agent device 440 and/or the agent thereof, a token, a password, an identification associated with the notification, an identification of the signal, etc.) to communication network 408. Communication network 408 may then connect agent device 440 to second connection context 420. In some instances, automated service 424 may remain connected to second connection context 420. Automated service 424 may store communications transmitted through the second communication channel for training and/or retraining of any of the machine-learning models that make up automated service 424. In addition, automated service 424 may receive input from agent device 416 or agent device 440 and process that input to generate a response (e.g., as previously described). In other instances, agent device 416 or agent device 440 may terminate automated service 424 causing automated service 424 to disconnect from connection context 420.

Agent device 416 and agent device 440 may remain connected to second connection context 440 until a purpose of establishing second connection context 420 is completed. For example, agent device 416, using the embedded signal, facilitated the instantiation of second connection context 420 to establish communications with agent device 440 (e.g., to query agent device 440, receive input or help from agent device 440, etc.). Once agent device 416 receives communications from agent device 440 that satisfies the purpose of establishing communications with agent device 440, agent device 440 may disconnect from second connection context 420 and agent device 416 may transmit a second signal over the second communication channel. The second signal may be detected by signal detector 436, which may transmit a second interrupt and notification to communication network 408. Communication network 408, in response to receiving the second interrupt and notification, may terminate second connection context 420 and reconnect agent device 416 to first connection context 412 enabling agent device 416 to resume communications with user device 404 over the first communication channel. In some instances, instead of transmitting a second signal, agent device 416 may transmit a termination request to automated service 424 (e.g., using a command, natural language statement, etc.) indicating a termination of second connection context 420 and reconnection to first connection context 412. Automated service 424, in response to receiving the termination request, may facilitate the termination of second connection context 420 and cause agent device 416 to be reconnected to first connection context 412 enabling agent device 416 to resume communications with user device 404 over the first communication channel.

Alternatively, agent device 440 and/or agent device 416 may connect to first connection context 416 as shown by FIG. 4C. FIG. 4C depicts a block diagram of combined voice and signaling of an example communication network configured to route communications and connections between various devices and services according to aspects of the present disclosure. For example, agent device 416 and/or agent device 440 may determine that agent device 440 should connect to first connection context 412 and to communicate with user device 404. Agent device 416 and/or agent device 440 may transmit a signal over the second communication channel. The second signal may be detected by signal detector 436, which may transmit a second interrupt and notification to communication network 408. Communication network 408, in response to receiving the second interrupt and notification, may terminate second connection context 420 and reconnect agent device 416 to first connection context 412 enabling agent device 440 (as shown) and/or agent device 416 to communicate with user device 404 over the first communication channel.

In some instances, both agent device 416 and agent device 440 may connect to first connection context 412 to communicate with user device 404. In those instances, agent device 416 may transmit the second signal for both agent device 416 and agent device 440. Alternatively, agent device 440 may transmit the second signal for both agent device 416 and agent device 440. Alternatively, communication network 408 may execute functions for a single device such that for agent device 416 and agent device 440 to be connected to first connection context 412, agent device 416 may transmit the second signal to cause agent device 416 to be connected to connection context 416 and agent device 440 may transmit the second signal to cause agent device 440 to be connected to first connection context.

Automated service 428, which may be optionally connected to connection context 412 when agent device 416 transmitted the signal to instantiate connection context 420, may remain connected to first connection context 412. Automated service 428 may record communications between user device 404 and agent device 440 and/or agent device 416 for use in training and/or retraining any of the machine-learning models of automated service 428 (as previously described).

Figure 5:
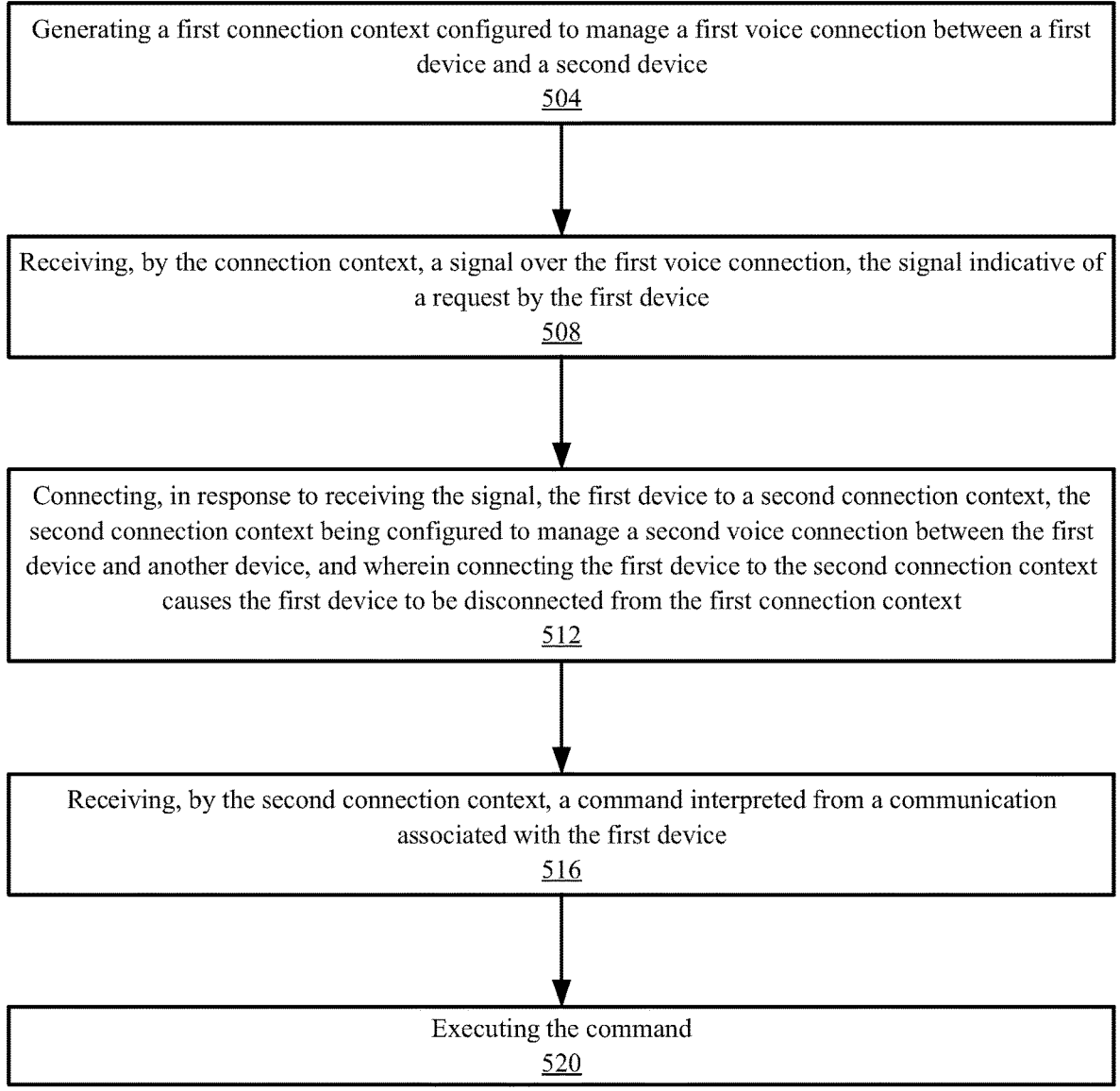
FIG. 5 illustrates a flowchart of an example process for implementing combined voice and signaling in communication networks according to aspects of the present disclosure.

FIG. 5 illustrates a flowchart of an example process for implementing combined voice and signaling in communication networks according to aspects of the present disclosure. At block 504 a computing device of a communication network may generate a first connection context configured to manage a first voice connection between a first device and a second device. The first connection context may be a software environment that facilitates a communication connection between the first device and the second device. The connection context may facilitate the routing of communications received from the first device through the communication network to the second device and communications received from the second device through the communication network to the first device.

The first device may be a device operated by an agent of the communication network. The first device may operate within the communication network or be external from the communication network. The second device may be a device operated by a user that connected to the communication network to resolve an issue associated with a product and/or service provided by the communication network or a client thereof. The first device and the second device may of a same or different type of device. Examples of device types that may correspond to the first device and the second device include, but are not limited to, computing devices (e.g., computers, servers, etc.), mobile devices (e.g., smartphone, tablet, etc.), telephones (e.g., landline or cellular telephones, etc.), and/or the like.

At block 508, a signal may be received over the first voice connection at the first connection context. The signal may include a command from the first device to execute a function and/or control of the communication network. For example, the request may correspond to a command to establish a second connection context for the first device to communicate with another device or service of the communication network.

The signal may be embedded in a communication that is of a same type as other communications transmitted over the first communication channel. For example, if the first communication channel is an audio-based channel (e.g., such as a telephonic, etc.), then the signal may be transmitted as an audio signal over the first communication channel. If the first communication channel is an audiovisual channel (e.g., such as a video conference, etc.), then the signal may be embedded into an existing frame of video (e.g., as a watermark, etc.) or in an extra frame that is added to the video being transmitted. The signal be transmitted in a manner that prevents the second device from detecting the presence of the signal. For example, the signal may be transmitted at a frequency that is too high or love for human hearing (e.g., approximately less than 20 Hz or higher than 20 kHz, etc.). Alternatively, the first connection context may include one or more bandpass filters configured to filter the frequencies of the signal such that once the signal reaches the communication network, the signal may be removed from the first communication channel.

At block 512, the computing device may connect, in response to receiving the signal, the first device to a second connection context. The second connection context may be configured to manage a second voice connection between the first device and another device (e.g., such as the computing device or another device of the communication network, etc.) or a service (e.g., of the communication network, etc.). Connecting the first device to the second connection context may the first device to be disconnected from the first connection context.

The first connection context and the second connection context may facilitate communications of the same type (e.g., voice, video, audiovisual, text, data, etc.). For example, since the first connection context may facilitate voice communications the second connection context may also facilitate voice communications. Alternatively, if the first device includes alternative communication functionality (e.g., if the first device is configured to communicate using another medium such a video, text, or data, or using another communication protocol such as a data connection, etc.), the second connection context may facilitate communications of a predetermined communication type selected by the first device or the communication network based on the capabilities of the first device.

The second device may remain connected to the first connection context. In some instances, the communication network may connect an automated service configured to communicate with the first device to interact with a user of the second device to reduce a likelihood that the second device will disconnect from the first connection context. Alternatively, the communication network may present media through the first connection context for the user of the second device.

The other device connected to the second connection context may be a device configured to execute functions within the communication network. In some instances, the other device may be operated by another agent (e.g., such as a supervisory agent, a subject matter expert, etc.) that may have information requested by the first device and/or second device. In other instances, the other device may be or be operated by an automated service configured to communicate using natural language (e.g., via text, video, speech, etc.) and execute function calls (e.g., API functions, remote procedure calls, controls, etc.) to implement functionality of the communication network available to devices that operate within the communication network. While connected to the other device, the first device can implement the functionality of any device operating within the communication network (and for which the first device has the appropriate execution permissions).

At block 516, the other device, via the second connection context, may receive a command interpreted from a communication received from or associated with the first device. Over a voice connection, the command may be an audio-based command (e.g., such as, but not limited to, a natural language phrase or statement, one or more tones, etc.). For example, the first device may transmit a voice communication to the automated service requesting the automated service identify information stored within a user profile associated with the second device. The automated service may process the communication, execute the request for information, and transmit a response voice communication that includes the requested communication (e.g., using natural language or by voice-based recitation of the requesting information).

The command may be interpreted by the other device from communications received from the first device and correspond to a function of the communication network. If the command is restricted to authorized devices, the first device may include with the command authorization credentials. Alternatively, the third device may authenticate the first device and/or the agent operating the first device using information associated with the first device (e.g., based on an address, Internet Protocol address, telephone number, media access identifier (MAID), voice pattern analysis, text input analysis, facial recognition, combinations thereof, or the like) and authenticate the command based on the information.

At block 520, the other device may facilitate execution of the command by the communication network to implement the functionality designated by the first device. The functionality may correspond to a function of the communication network and/or any device connected thereto. For example, the function may modify the first connection context (e.g., causing the second device to be connected to an automated service, causing the second device to be connected to a terminal device of the communication network, causing the second device to be connected to a user device, changing a communication protocol used by the communication channel such as but not limited to changing the communication protocol from a public switched network (PSTN) to a transmission control protocol over Internet Protocol (TCP/IP), changing a communication channel such as from telephonic to text messaging, etc.), terminate the first connection context, generate a new connection context, present information through the first connection context to the second device such as information generated by the automated service, modify a service being provided to the second device, modify information associated with the second device, obtain information associated with a product or service of the communication network or a client thereof, obtain information associated with the second device or the user thereof (e.g., such as a billing information, account information, profile information, historical information, communication information, combinations thereof, or the like.

For example, a user device may connect to a communication network that provides customer service operations using a communication channel. The communication network may determine that the user device is to be connected to an agent that is outside the communication network. The communication network may establish a first connection context and route communications through the connection context to an external device operated by the agent using the same communication channel. During the connection, the external device may need additional information or execute functions of the communication network to satisfy the user device. The external device may transmit a signal over the communication channel that may be detected by the communication network.

The communication network may then pause the first connection context, disconnect the external device from the first connection context, generate a second connection context, and connect the external device to the second connection context. The second connection context may connect the external device to an automated service, a terminal device operated by another agent or a supervisory agent, another device, etc. The external device may transmit commands corresponding to, for example, a request for information associated with the user device or the user thereof. A device and/or service of connected to the second connection context may receive and execute the commands for the external device. Executing the commands may result in the requested information be communicated over the communication channel to the external device. The external device may then transmit a signal (e.g., similar to or the same as the signal of block 508) to cause the external device to be reconnected to the first connection context. The second connection context may then be terminated.

Figure 6:
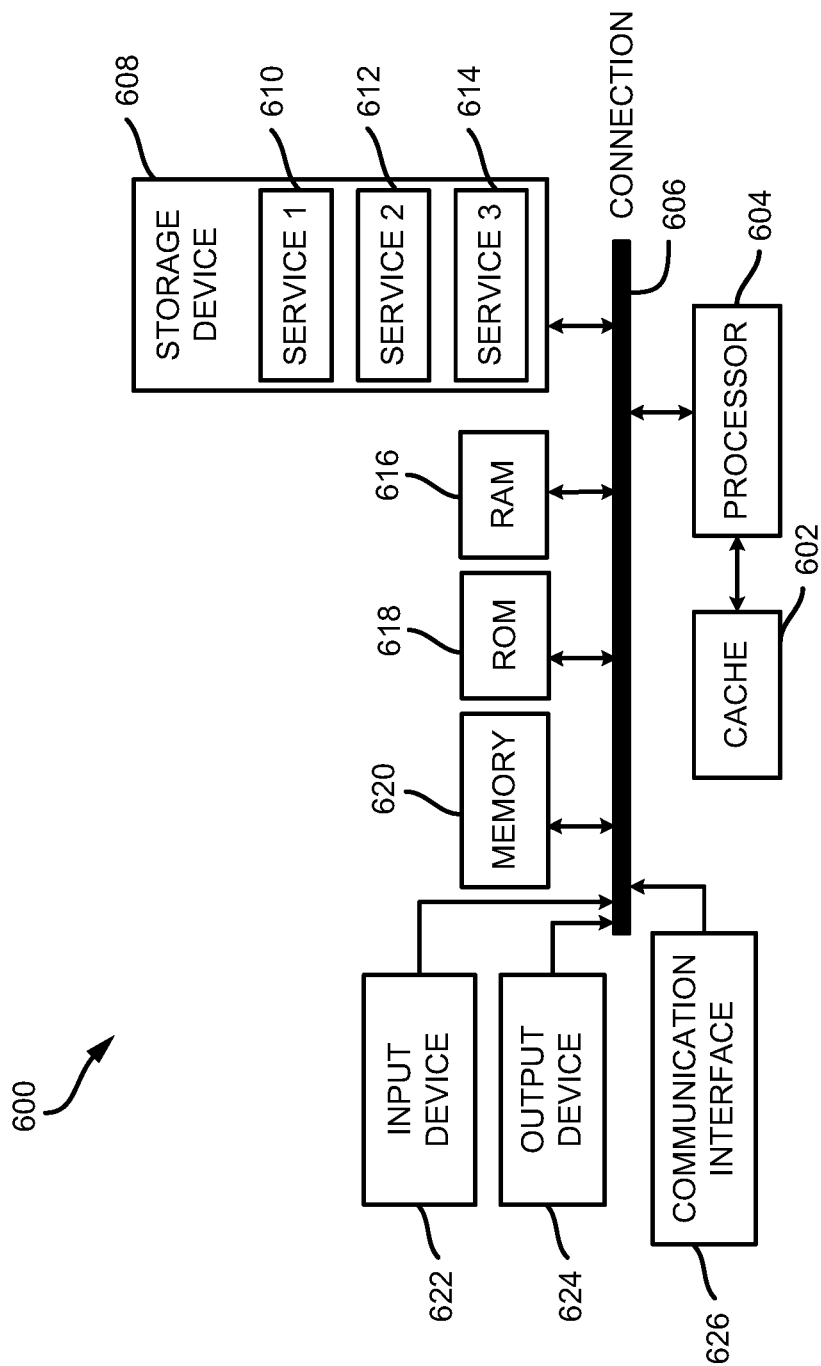
FIG. 6 illustrates an example computing device architecture of an example computing device that can implement the various techniques described herein according to aspects of the present disclosure.

FIG. 6 illustrates an example computing device according to aspects of the present disclosure. For example, computing device 600 can implement any of the systems or methods described herein. In some instances, computing device 600 may be a component of or included within a media device. The components of computing device 600 are shown in electrical communication with each other using connection 606, such as a bus. The example computing device architecture 600 includes a processor (e.g., CPU, processor, or the like) 604 and connection 606 (e.g., such as a bus, or the like) that is configured to couple components of computing device 600 such as, but not limited to, memory 620, read only memory (ROM) 618, random access memory (RAM) 616, and/or storage device 608, to processing unit 610.

Computing device 600 can include a cache 602 of high-speed memory connected directly with, in close proximity to, or integrated within processor 604. Computing device 600 can copy data from memory 620 and/or storage device 608 to cache 602 for quicker access by processor 604. In this way, cache 602 may provide a performance boost that avoids delays while processor 604 waits for data. Alternatively, processor 604 may access data directly from memory 620, ROM 817, RAM 616, and/or storage device 608. Memory 620 can include multiple types of homogenous or heterogeneous memory (e.g., such as, but not limited to, magnetic, optical, solid-state, etc.).

Storage device 608 may include one or more non-transitory computer-readable media such as volatile and/or non-volatile memories. A non-transitory computer-readable medium can store instructions and/or data accessible by computing device 600. Non-transitory computer-readable media can include, but is not limited to magnetic cassettes, hard-disk drives (HDD), flash memory, solid state memory devices, digital versatile disks, cartridges, compact discs, random access memories (RAMs) 625, read only memory (ROM) 620, combinations thereof, or the like.

Storage device 608, may store one or more services, such as service 1 610, service 2 612, and service 3 614, that are executable by processor 604 and/or other electronic hardware. The one or more services include instructions executable by processor 604 to: perform operations such as any of the techniques, steps, processes, blocks, and/or operations described herein; control the operations of a device in communication with computing device 600; control the operations of processing unit 610 and/or any special-purpose processors; combinations therefor; or the like. Processor 604 may be a system on a chip (SOC) that includes one or more cores or processors, a bus, memories, clock, memory controller, cache, other processor components, and/or the like. A multi-core processor may be symmetric or asymmetric.

Computing device 600 may include one or more input devices 622 that may represent any number of input mechanisms, such as a microphone, a touch-sensitive screen for graphical input, keyboard, mouse, motion input, speech, media devices, sensors, combinations thereof, or the like. Computing device 600 may include one or more output devices 624 that output data to a user. Such output devices 624 may include, but are not limited to, a media device, projector, television, speakers, combinations thereof, or the like. In some instances, multimodal computing devices can enable a user to provide multiple types of input to communicate with computing device 600. Communications interface 626 may be configured to manage user input and computing device output. Communications interface 626 may also be configured to managing communications with remote devices (e.g., establishing connection, receiving/transmitting communications, etc.) over one or more communication protocols and/or over one or more communication media (e.g., wired, wireless, etc.).

Computing device 600 is not limited to the components as shown if FIG. 6. Computing device 600 may include other components not shown and/or components shown may be omitted.

The following examples describe various example implementations of the present disclosure. The examples are non-exhaustive and interchangeable. As used below, any reference to a series of examples is to be understood as a reference to each of those examples disjunctively (e.g., "Examples 1-4" is to be understood as "Examples 1, 2, 3, or 4").

Example 1 is a method comprising: generating a first connection context configured to manage a first voice connection between a first device and a second device; receiving, by the connection context, a signal over the first voice connection, the signal indicative of a request by the first device; connecting, in response to receiving the signal, the first device to a second connection context, the second connection context being configured to manage a second voice connection between the first device and another device, and wherein connecting the first device to the second connection context causes the first device to be disconnected from the first connection context; receiving, by the second connection context, a command interpreted from a communication associated with the first device; and executing the command.

Example 2 is the method of any of example(s) 1 and 3-11, wherein the first connection context filters the signal to prevent the signal from being detected by the second device.

Example 3 is the method of any of example(s) 1-2 and 4-11, wherein the signal is an audible tone detected by a dual-tone multi-frequency system.

Example 4 is the method of any of example(s) 1-3 and 5-11, wherein the other device includes an automated communication service configured to interact with the first device using natural language.

Example 5 is the method of any of example(s) 1-4 and 6-11, further comprising: connecting, in response to executing the command, a third device to the second connection context, wherein connecting the third device to the second connection context causes the other device to be disconnected from the second connection context.

Example 6 is the method of any of example(s) 1-5 and 7-11, further comprising: connecting, in response to executing the command, the first device to the first connection context, the first device being configured to resume communications with the second device, and wherein connecting the first device to the first connection context causes the first device to disconnected from the second connection context.

Example 7 is the method of any of example(s) 1-6 and 8-10, further comprising: connecting an automated service to the first connection context, the automated service being configured to transmit content to the second device.

Example 8 is the method of any of example(s) 1-7 and 9-10, further comprising: determining that the first device has disconnected from the second connection context; and terminating the second connection context.

Example 9 is the method of any of example(s) 1-8 and 10, wherein the first connection context operates in parallel to the second connection context.

Example 10 is the method of any of example(s) 1-9, wherein the first connection context maintains a connection with the second device while the first device is connected to the second connection context.

Example 11 is a system comprising: one or more processors; and a machine-readable storage medium storing instructions that when executed by the one or more processors, cause the one or more processors to perform any of example(s)s 1-10.

Example 12 is a non-transitory machine-readable storage medium storing instructions that when executed by one or more processors, cause the one or more processors to perform any of example(s)s 1-10.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored in a form that excludes carrier waves and/or electronic signals. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Some portions of this description describe examples in terms of algorithms and symbolic representations of operations on information. These operations, while described functionally, computationally, or logically, may be implemented by computer programs or equivalent electrical circuits, microcode, or the like. Furthermore, arrangements of operations may be referred to as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module can be implemented with a computer-readable medium storing computer program code, which can be executed by a processor for performing any or all of the steps, operations, or processes described.

Some examples may relate to an apparatus or system for performing any or all of the steps, operations, or processes described. The apparatus or system may be specially constructed for the required purposes, and/or it may comprise a general-purpose computing device selectively activated or reconfigured by a computer program stored in memory of computing device. The memory may be or include a non-transitory, tangible computer readable storage medium, or any type of media suitable for storing electronic instructions, which may be coupled to a bus. Furthermore, any computing systems referred to in the specification may include a single processor or multiple processors.

While the present subject matter has been described in detail with respect to specific examples, it will be appreciated that those skilled in the art, upon attaining an understanding of the foregoing, may readily produce alterations to, variations of, and equivalents to such embodiments. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art.

For clarity of explanation, in some instances the present disclosure may be presented as including individual functional blocks including functional blocks comprising devices, device components, steps or routines in a method embodied in software, or combinations of hardware and software. Additional functional blocks may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual examples may be described herein as a process or method which may be depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not shown. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

Devices implementing the methods and systems described herein can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. The program code may be executed by a processor, which may include one or more processors, such as, but not limited to, one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A processor may be a microprocessor; conventional processor, controller, microcontroller, state machine, or the like. A processor may also be implemented as a combination of computing components (e.g., a combination of a DSP and a microprocessor, a plurality of microprocessors, one or more microprocessors in conjunction with a DSP core, or any other such configuration). Accordingly, the term "processor," as used herein may refer to any of the foregoing structure, any combination of the foregoing structure, or any other structure or apparatus suitable for implementation of the techniques described herein. Functionality described herein also can be embodied in peripherals or add-in cards. Such functionality can also be implemented on a circuit board among different chips or different processes executing in a single device, by way of further example.

In the foregoing description, aspects of the disclosure are described with reference to specific examples thereof, but those skilled in the art will recognize that the disclosure is not limited thereto. Thus, while illustrative examples of the disclosure have been described in detail herein, it is to be understood that the inventive concepts may be otherwise variously embodied and employed, and that the appended claims are intended to be construed to include such variations. Various features and aspects of the above-described disclosure may be used individually or in any combination. Further, examples can be utilized in any number of environments and applications beyond those described herein without departing from the broader spirit and scope of the disclosure. The disclosure and figures are, accordingly, to be regarded as illustrative rather than restrictive.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or media devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A method comprising:
generating a first connection context configured to manage a first voice connection between a first device and a second device;
receiving, by the first connection context, a signal over the first voice connection, the signal indicative of a request by the first device;
connecting, in response to receiving the signal, the first device to a second connection context, the second connection context being configured to manage a second voice connection between the first device and a third device, and wherein connecting the first device to the second connection context causes the first device to be disconnected from the first connection context;
receiving, by the second connection context, a command interpreted from a communication associated with the first device; and
connecting, in response to executing the command, the third device to the second connection context which causes the second device to be disconnected from the second connection context.

2. The method of claim 1, wherein the first connection context filters the signal to prevent the signal from being detected by the second device.

3. The method of claim 1, wherein the signal is an audible tone detected by a dual-tone multi-frequency system.

4. The method of claim 1, wherein the third device includes an automated communication service configured to interact with the first device using natural language.

5. The method of claim 1, further comprising:
connecting the first device to the first connection context, the first device being configured to resume communications with the second device.

6. The method of claim 1, further comprising:
connecting an automated service to the first connection context, the automated service being configured to transmit content to the second device.

7. A system comprising:
one or more processors; and
a machine-readable storage medium storing instructions that when executed by the one or more processors, cause the one or more processors to perform operations including:
generating a first connection context configured to manage a first voice connection between a first device and a second device;
receiving, by the first connection context, a signal over the first voice connection, the signal indicative of a request by the first device;
connecting, in response to receiving the signal, the first device to a second connection context, the second connection context being configured to manage a second voice connection between the first device and a third device, and wherein connecting the first device to the second connection context causes the first device to be disconnected from the first connection context;
receiving, by the second connection context, a command interpreted from a communication associated with the first device; and
connecting, in response to executing the command, the third device to the second connection context which causes the second device to be disconnected from the second connection context.

8. The system of claim 7, wherein the first connection context filters the signal to prevent the signal from being detected by the second device.

9. The system of claim 7, wherein the signal is an audible tone detected by a dual-tone multi-frequency system.

10. The system of claim 7, wherein the third device includes an automated communication service configured to interact with the first device using natural language.

11. The system of claim 7, wherein the operations further include:
connecting the first device to the first connection context, the first device being configured to resume communications with the second device.

12. The system of claim 7, wherein the operations further include:
connecting an automated service to the first connection context, the automated service being configured to transmit content to the second device.

13. A non-transitory machine-readable storage medium storing instructions that when executed by one or more processors, cause the one or more processors to perform operations including:
generating a first connection context configured to manage a first voice connection between a first device and a second device;
receiving, by the first connection context, a signal over the first voice connection, the signal indicative of a request by the first device;
connecting, in response to receiving the signal, the first device to a second connection context, the second connection context being configured to manage a second voice connection between the first device and a third device, and wherein connecting the first device to the second connection context causes the first device to be disconnected from the first connection context;
receiving, by the second connection context, a command interpreted from a communication associated with the first device; and
connecting, in response to executing the command, the third device to the second connection context which causes the second device to be disconnected from the second connection context.

14. The non-transitory machine-readable storage medium of claim 13, wherein the first connection context filters the signal to prevent the signal from being detected by the second device.

15. The non-transitory machine-readable storage medium of claim 13, wherein the signal is an audible tone detected by a dual-tone multi-frequency system.

16. The non-transitory machine-readable storage medium of claim 13, wherein the third device includes an automated communication service configured to interact with the first device using natural language.

17. The non-transitory machine-readable storage medium of claim 13, wherein the operations further include:
   connecting the first device to the first connection context, the first device being configured to resume communications with the second device.

* * * * *